US012273691B2

(12) United States Patent
Goto et al.

(10) Patent No.: US 12,273,691 B2
(45) Date of Patent: Apr. 8, 2025

(54) NOISE REDUCTION SYSTEM AND NOISE REDUCTION METHOD

(71) Applicant: KABUSHIKI KAISHA TOSHIBA, Tokyo (JP)

(72) Inventors: Tatsuhiko Goto, Kawasaki Kanagawa (JP); Osamu Nishimura, Kawasaki Kanagawa (JP); Akihiko Enamito, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 228 days.

(21) Appl. No.: 18/176,213

(22) Filed: Feb. 28, 2023

(65) Prior Publication Data

US 2024/0098408 A1 Mar. 21, 2024

(30) Foreign Application Priority Data

Sep. 15, 2022 (JP) ................................ 2022-147383

(51) Int. Cl.
*H04R 3/00* (2006.01)
*G10K 11/16* (2006.01)

(52) U.S. Cl.
CPC ............... *H04R 3/00* (2013.01); *G10K 11/16* (2013.01)

(58) Field of Classification Search
CPC .. G10K 11/16; G10K 11/178; G10K 11/1781; G10K 11/17813; G10K 11/17815; G10K 11/17817; H04R 3/00
USPC ........................................................ 381/94.1
See application file for complete search history.

(56) References Cited

U.S. PATENT DOCUMENTS 10,438,579 B2 10/2019 Goto et al.
10,587,945 B2 3/2020 Mizuuchi et al.
11,100,911 B1 * 8/2021 Jain .................. G10K 11/17854
11,445,289 B2 9/2022 Igarashi et al.
2010/0124341 A1 * 5/2010 Kano .................. H04R 1/1083 381/94.1
2014/0307887 A1 * 10/2014 Alderson ............... G10K 11/16 381/71.8
2015/0086031 A1 3/2015 Goto
2015/0172813 A1 6/2015 Goto et al.
(Continued)

FOREIGN PATENT DOCUMENTS

EP 2189974 A2 * 5/2010 ......... G10K 11/1782
EP 3761307 A1 * 1/2021 ........... G10K 11/178
JP 5823362 B2 11/2015
(Continued)

*Primary Examiner* — David L Ton
(74) *Attorney, Agent, or Firm* — Finnegan, Henderson, Farabow, Garrett & Dunner, LLP

(57) ABSTRACT

According to one embodiment, a noise reduction system includes a microphone, a loudspeaker, and processing circuitry. The processing circuitry switches an operating mode between a control mode and a path characteristic measurement mode, includes a control filter that generates a control signal that causes the loudspeaker to output a control sound for reducing noise, based on a detection signal obtained by detecting a first sound including the noise with the microphone, measures a path characteristic including an acoustic characteristic between the loudspeaker and the microphone, and generates the control filter by using a measurement result of the path characteristic and a noise feature signal including a feature of the noise.

14 Claims, 23 Drawing Sheets

(56) References Cited

U.S. PATENT DOCUMENTS

| | | | | |
|---|---|---|---|---|
| 2020/0349917 | A1* | 11/2020 | Toh | G10K 11/17823 |

FOREIGN PATENT DOCUMENTS

| | | | | |
|---|---|---|---|---|
| JP | 2016182298 | A * | 10/2016 | G10K 11/178 |
| JP | 6125389 | B2 | 5/2017 | |
| JP | 6129591 | B2 | 5/2017 | |
| JP | 6214884 | B2 | 10/2017 | |
| JP | 6645991 | B2 | 2/2020 | |
| JP | 2021-57923 | A | 4/2021 | |
| JP | 2021-61629 | A | 4/2021 | |
| JP | 2022-31960 | A | 2/2022 | |
| JP | 2022-46259 | A | 3/2022 | |
| JP | 2022-53341 | A | 4/2022 | |
| JP | 7070576 | B2 | 5/2022 | |
| KR | 101893294 | B1 * | 8/2018 | G10K 11/04 |

* cited by examiner

NOISE REDUCTION SYSTEM AND NOISE REDUCTION METHOD

CROSS-REFERENCE TO RELATED APPLICATION

This application is based upon and claims the benefit of priority from Japanese Patent Application No. 2022-147383, filed Sep. 15, 2022, the entire contents of which are incorporated herein by reference.

FIELD

Embodiments described herein relate generally to a noise reduction system and a noise reduction method.

BACKGROUND

Noise having discrete frequency components is generated from various devices such as power generators, engines, fans, exhaust devices, pipes, and rotary devices. Successful reduction of such noise is demanded.

As a conventional noise reduction technique, a passive noise countermeasure using a silencer, a sound absorbing material, or the like is the mainstream. In addition, noise countermeasures including vibration insulation and vibration reduction using a dynamic vibration absorber or the like are also taken. Under these measures, device noise is generally reduced so as to satisfy environmental standards regarding noise.

On the other hand, as a noise reduction technique, there is also a noise reduction technique called active noise control (ANC), which uses sound wave interference. However, there are two problems that make it difficult to apply ANC, as described below.

In ANC, a control filter that generates a control signal for output from a loudspeaker is constantly updated. Hence, system implementation is complicated, and it is not possible to easily apply ANC unlike passive noise countermeasures. This is the first problem.

In ANC, the basis is to reduce the level of a microphone signal, but the acoustic characteristics from the loudspeaker to the microphone change according to the environment such as temperature or humidity. Hence, the acoustic characteristics need to be periodically updated. This is the second problem.

As a solution to the first problem, it is known to use a fixed control filter. ANC using a fixed control filter is employed in, for example, noise canceling headphones. In the noise canceling headphone, the fixed control filter is designed to reduce noise of about 100 Hz or less.

However, there is much noise having discrete frequency components even at 100 Hz or more, and the conventional fixed control filter design cannot cope with such noise. Furthermore, since the fixed filer is based on sensitivity function design in classical control theory, if the distance between the loudspeaker and the microphone is large, the time delay is significant, and therefore the upper limit of controllable frequency lowers.

As a solution to the second problem, a technique of simultaneously performing noise control and acoustic characteristic measurement is proposed. However, such a technique further complicates system implementation, and makes the first problem severer.

DETAILED DESCRIPTION

According to one embodiment, a noise reduction system includes a microphone, a loudspeaker, and processing circuitry. The microphone is configured to convert a sound wave into an electric signal. The loudspeaker is configured to convert an electric signal into a sound wave. The processing circuitry is configured to function as a mode switching unit, a control signal generator, a path characteristic measuring unit, and a control filter generating unit. The mode switching unit switches an operating mode between a control mode and a path characteristic measurement mode. The control signal generator operates when the operating mode is set to the control mode and includes a control filter that generates a control signal that causes the loudspeaker to output a control sound for reducing noise, based on a first detection signal obtained by detecting a first sound including the noise with the microphone. The path characteristic measuring unit operates when the operating mode is set to the path characteristic measurement mode and measures a path characteristic including an acoustic characteristic between the loudspeaker and the microphone. The control filter generating unit generates the control filter by using a measurement result of the path characteristic, a noise feature signal including a feature of the noise, and a first control band limiting filter that performs band limitation on the noise feature signal according to a predetermined frequency band.

Hereinafter, embodiments will be described with reference to the accompanying drawings.

Figure 1:
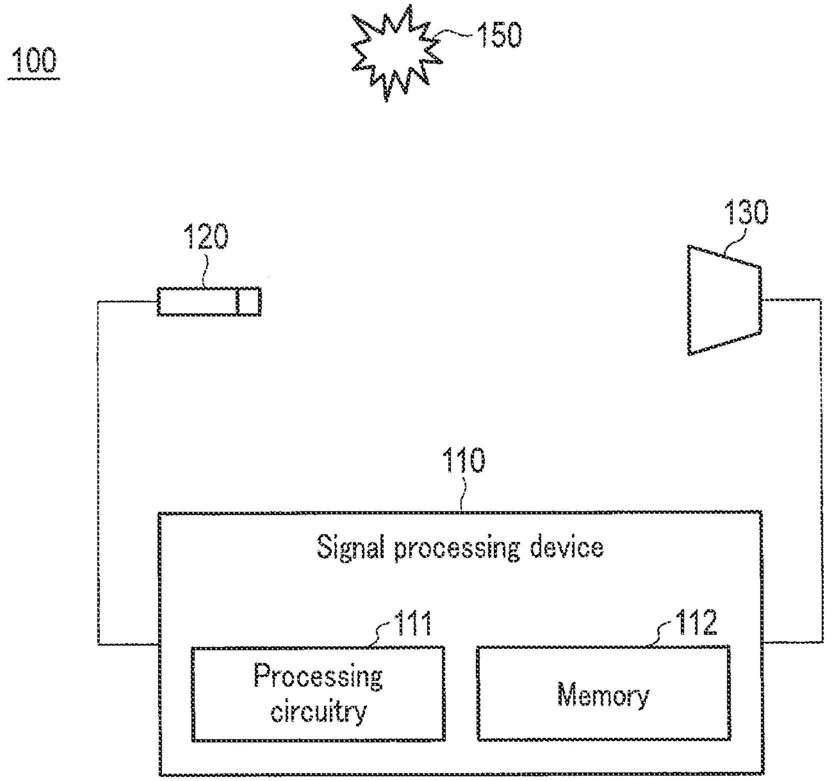
FIG. 1 is a diagram showing a noise reduction system according to an embodiment.

FIG. 1 schematically shows a noise reduction system 100 according to an embodiment. A noise source 150 shown in FIG. 1 emits, to a space, noise such as noise having discrete frequency components. The noise reduction system 100 reduces noise from the noise source 150 in the space. Specifically, the noise reduction system 100 emits, to the space, a sound for reducing noise from the noise source 150. The noise reduction system 100 includes a signal processing device 110, a microphone 120, and a loudspeaker 130. The signal processing device 110 is coupled to the microphone 120 and the loudspeaker 130.

The microphone 120 is a converter that converts a sound wave into an electric signal. The microphone 120 detects a sound in the space including noise to generate a detection signal. The detection signal indicates the sound pressure at a microphone position that is the position where the microphone 120 is placed.

The signal processing device 110 generates, based on the detection signal from the microphone 120, a control signal that causes the loudspeaker 130 to output a sound for reducing noise. The control signal is an electric signal for driving the loudspeaker 130, and the signal processing device 110 applies the control signal to the loudspeaker 130.

The loudspeaker 130 is a converter that converts an electric signal into a sound wave. The loudspeaker 130 emits, to the space, a sound based on the control signal from the signal processing device 110. Hereinafter, a sound based on the control signal outputted from the loudspeaker 130 (that is, a sound for reducing noise) is also referred to as a control sound.

The signal processing device 110 includes, as hardware components, processing circuitry 111 and a memory 112 coupled to the processing circuitry 111. Processing described for the signal processing device 110 is performed by the processing circuitry 111. The processing circuitry 111 may include a combination of an analog circuit and a digital circuit. The processing circuitry 111 may include one or more processors. Examples of the processor include a CPU (central processing unit), a GPU (graphics processing unit), a DSP (digital signal processor), an FPGA (field-programmable gate array), and the like.

At least part of the processing described for the signal processing device 110 may be performed by a general-purpose processor such as a CPU executing a program stored in the memory 112. The program may be provided to the signal processing device 110 in a state of being stored in a computer-readable recording medium. In this case, the signal processing device 110 includes a drive that reads out data from a recording medium, and acquires a program from the recording medium. Examples of the recording medium include a magnetic disk, an optical disk (a CD-ROM, a CD-R, a DVD-ROM, a DVD-R, or the like), a magneto-optical disk (an MO or the like), and a semiconductor memory. The program may also be distributed through a network. Specifically, the program may be stored in a server on a network, and the signal processing device 110 may download the program from the server.

The microphone 120 may be placed in any place. For example, the microphone 120 is placed in the vicinity of the loudspeaker 130 including a location on the axis of the loudspeaker 130. In the non-limiting example shown in FIG. 1, it is placed on the axis of the loudspeaker 130. The axis of the loudspeaker 130 is, for example, a virtual axis that passes through the center of a diaphragm of the loudspeaker 130 (for example, a loudspeaker cone) and is parallel to the vibration direction of the diaphragm. The vicinity of the loudspeaker 130 is a distance space where, if a noise signal from the noise source 150 recorded in advance is regenerated by the loudspeaker 130, a sound pressure of −6 dB or more can be reproduced in the following control band at the microphone position. For example, in a case where a detection signal obtained by detecting noise from the noise source 150 with the microphone 120 indicates 90 dB, the vicinity of the loudspeaker 130 is a distance range in which a sound pressure of 84 dB or more can be reproduced. The microphone 120 may be attached to the loudspeaker 130 through a member attached to the loudspeaker 130. The member is not limited to a jig for attaching the microphone 120, and may be a member for the loudspeaker 130. For example, the microphone 120 is attached to a front grille that covers a front surface of the loudspeaker 130.

Figure 2:
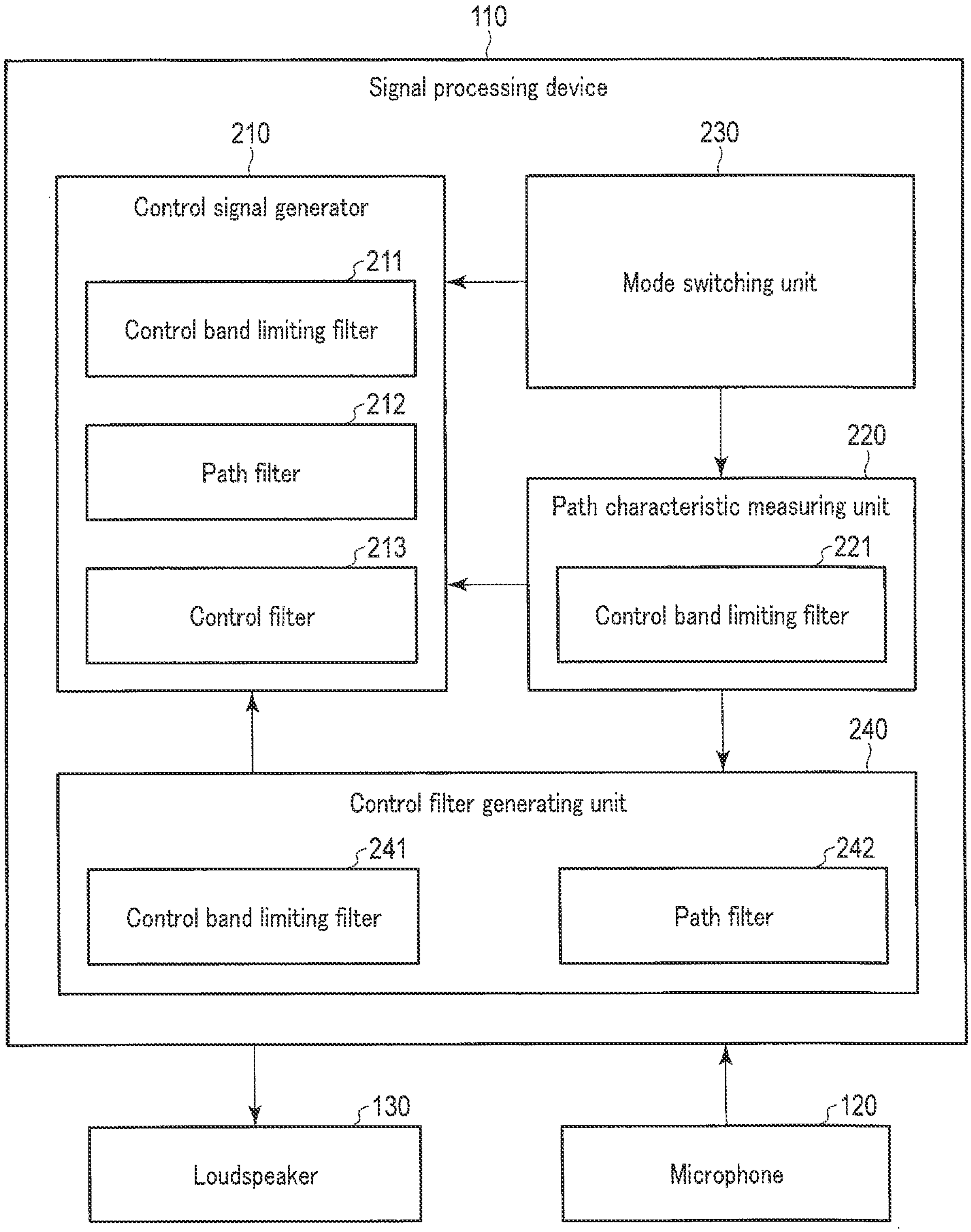
FIG. 2 is a diagram showing a signal processing device shown in FIG. 1.

FIG. 2 schematically shows an example of a functional configuration of the signal processing device 110. As shown in FIG. 2, the signal processing device 110 includes a control signal generator 210, a path characteristic measuring unit 220, a mode switching unit 230, and a control filter generating unit 240.

The control signal generator 210 includes a control band limiting filter 211, a path filter 212, and a control filter 213, and uses the filters 211, 212, and 213 to generate a control signal based on a detection signal from the microphone 120. The control signal is applied to the loudspeaker 130.

The control band limiting filter 211 performs band limitation on a detection signal from the microphone 120 according to a predetermined passband (frequency band) to generate a band-limited detection signal. Specifically, the control band limiting filter 211 extracts, from a detection signal, frequency components included in a predetermined passband. As the control band limiting filter 211, a bandpass filter that allows frequencies in a predetermined range to pass therethrough and attenuates frequencies outside the range can be used. The control band limiting filter 211 is used to limit a frequency band in which noise is to be controlled (reduced), and the frequency band in which noise is to be controlled is set as the predetermined passband. The frequency band in which noise is to be controlled is also referred to as a control band.

The path filter 212 generates a path characteristic signal based on a control signal outputted from the control filter 213. Specifically, the path filter 212 estimates a control sound at the microphone position based on a control signal to generate a path characteristic signal. The path characteristic signal indicates an estimated value of a component of the control sound included in the detection signal (specifically, the band-limited detection signal). The path filter 212 is generated or updated by the path characteristic measuring unit 220.

The control filter 213 generates a control signal based on the band-limited detection signal and the path characteristic signal. Specifically, an estimated noise signal indicating an estimated value of a component of noise included in the detection signal (specifically, the band-limited detection signal) is generated from the band-limited detection signal and the path characteristic signal, and the control filter 213 generates a control signal from the estimated noise signal. The control filter 213 is generated or updated by the control filter generating unit 240.

The path characteristic measuring unit 220 includes a control band limiting filter 221, and uses the control band limiting filter 221 to measure a path characteristic (transfer function) including an acoustic characteristic (spatial transfer function) between the loudspeaker 130 and the microphone 120. The control band limiting filter 221 has a filter characteristic equivalent to the filter characteristic of the control band limiting filter 211 of the control signal generator 210. In an example, the control band limiting filter 221 is the same as the control band limiting filter 211. That is, one control band limiting filter is shared by the control signal generator 210 and the path characteristic measuring unit 220. In another example, the control band limiting filter 221 is separate from the control band limiting filter 211. The path characteristic measuring unit 220 generates or updates the path filter 212 based on a measurement result of the path characteristic. The path filter 212 has a filter characteristic according to the measurement result of the path characteristic.

The mode switching unit 230 switches an operating mode of the signal processing device 110 between a control mode and a path characteristic measurement mode. The control mode is a mode of controlling noise, and the path characteristic measurement mode is a mode of measuring a path characteristic. When the operating mode is set to the path characteristic measurement mode, the path characteristic measuring unit 220 operates, and the control signal generator 210 is stopped. When the operating mode is set to the control mode, the control signal generator 210 operates, and the path characteristic measuring unit 220 is stopped.

The control filter generating unit 240 includes a control band limiting filter 241 and a path filter 242. The control band limiting filter 241 performs band limitation on a noise feature signal including a feature of noise according to a predetermined passband. The control band limiting filter 241 has a filter characteristic equivalent to the filter characteristic of the control band limiting filter 211. The path filter 242 is generated or updated by the path characteristic measuring unit 220. The path filter 242 has a filter characteristic according to a measurement result of the path characteristic obtained by the path characteristic measuring unit 220. The control filter generating unit 240 generates or updates the control filter 213 by using the noise feature signal, the control band limiting filter 241, and the path filter 242.

Figure 3:
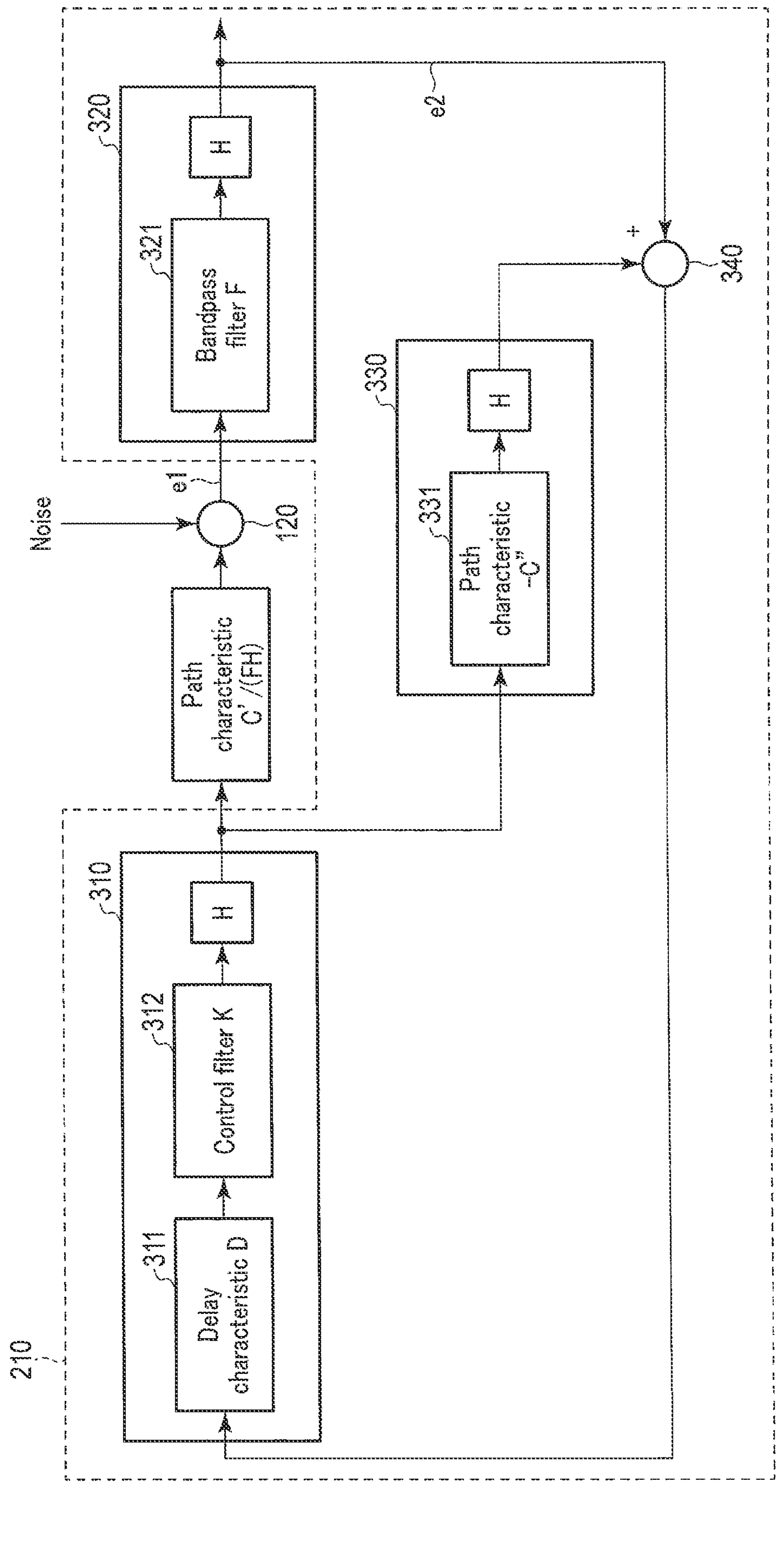
FIG. 3 is a diagram showing an example of a configuration of a control signal generator shown in FIG. 2.

FIG. 3 schematically shows an example of a configuration of the control signal generator 210. As shown in FIG. 3, the control signal generator 210 includes a delay filter 311, a control filter 312, a bandpass filter 321, a path filter 331, and an adder 340. The control filter 312, the bandpass filter 321, and the path filter 331 correspond to the control filter 213, the control band limiting filter 211, and the path filter 212 shown in FIG. 2, respectively.

In the example shown in FIG. 3, the control signal generator 210 is implemented by processing circuitry including three DSPs 310, 320, and 330, and the adder 340. The delay filter 311 and the control filter 312 are mounted on the DSP 310, the bandpass filter 321 is mounted on the DSP 320, and the path filter 331 is mounted on the DSP 330. H shown in FIG. 3 and other drawings represents a characteristic of each DSP. Specifically, characteristic H indicates a characteristic of an ADC (analog-to-digital converter) included in the DSP and a characteristic of a DAC (digital-to-analog converter) included in the DSP. The adder 340 includes, for example, an operational amplifier.

An output port of the microphone 120 is connected to an input port of the DSP 320. An output port of the DSP 320 is connected to a first input port of the adder 340. An output port of the DSP 330 is connected to a second input port of the adder 340. An output port of the adder 340 is connected to an input port of the DSP 310. An output port of the DSP 310 is connected to an input port of the loudspeaker 130 and an input port of the DSP 330.

The control filter 312 generates a control signal u based on a detection signal e1 obtained by the microphone 120. The control signal u is supplied to the loudspeaker 130 and the path filter 331. The loudspeaker 130 outputs a control sound being based on the control signal u to the space. The microphone 120 detects a sound in the space including the control sound and noise to generate the detection signal e1. The detection signal obtained by detecting a sound in the space including the control sound and noise with the microphone 120 is also referred to as an error signal.

The bandpass filter 321 receives the error signal e1 from the microphone 120, and performs band limitation on the error signal e1 according to a predetermined passband to generate an error signal e2. The bandpass filter 321 has, as a filter characteristic, a bandpass filter characteristic F according to the predetermined passband. The bandpass filter 321 converts the error signal e1 into the error signal e2 according to the bandpass filter characteristic F. In this example, the bandpass filter 321 is implemented by an FIR (finite impulse response) filter or an IIR (infinite impulse response) filter. Alternatively, the bandpass filter 321 may be implemented as an analog filter.

The path filter 331 receives the control signal u from the control filter 312, and generates a path characteristic signal from the control signal u. The path filter 331 has a path characteristic −C" as a filter characteristic. The path characteristic −C" is obtained by multiplying a path characteristic C" calculated based on a measurement result of the path characteristic by −1. The path characteristic C" will be described later. The path filter 331 converts the control signal u into the path characteristic signal according to the path characteristic −C". In this example, the path filter 331 is implemented by an FIR filter. Alternatively, the path filter 331 may be implemented by an IIR filter.

The adder 340 adds the path characteristic signal from the path filter 331 to the error signal e2 from the bandpass filter 321 to generate an estimated noise signal. In a case where the path filter 331 has a path characteristic C", a subtractor may be used instead of the adder 340. The subtractor subtracts the path characteristic signal from the error signal e2 to generate an estimated noise signal. The adder 340 or the subtractor corresponds to an estimation unit that estimates a component of noise included in a detection signal (specifically, a band-limited detection signal) to generate an estimated noise signal.

The delay filter 311 receives the estimated noise signal from the adder 340, and delays the estimated noise signal by a predetermined period of time of 0 seconds or more to generate a delayed estimated noise signal. The delay filter 311 has, as a filter characteristic, a delay characteristic D according to the predetermined period of time. The delay filter 311 converts the estimated noise signal into the delayed estimated noise signal according to the delay characteristic D.

The control filter 312 receives the delayed estimated noise signal from the delay filter 311, and generates a control signal from the delayed estimated noise signal. The control filter 312 has a control characteristic K as a filter characteristic. The control filter 312 converts the delayed estimated noise signal into the control signal according to the control characteristic K. In this example, the control filter 312 is implemented by an FIR filter. Alternatively, the control filter 312 may be implemented by an IIR filter.

Figure 4:
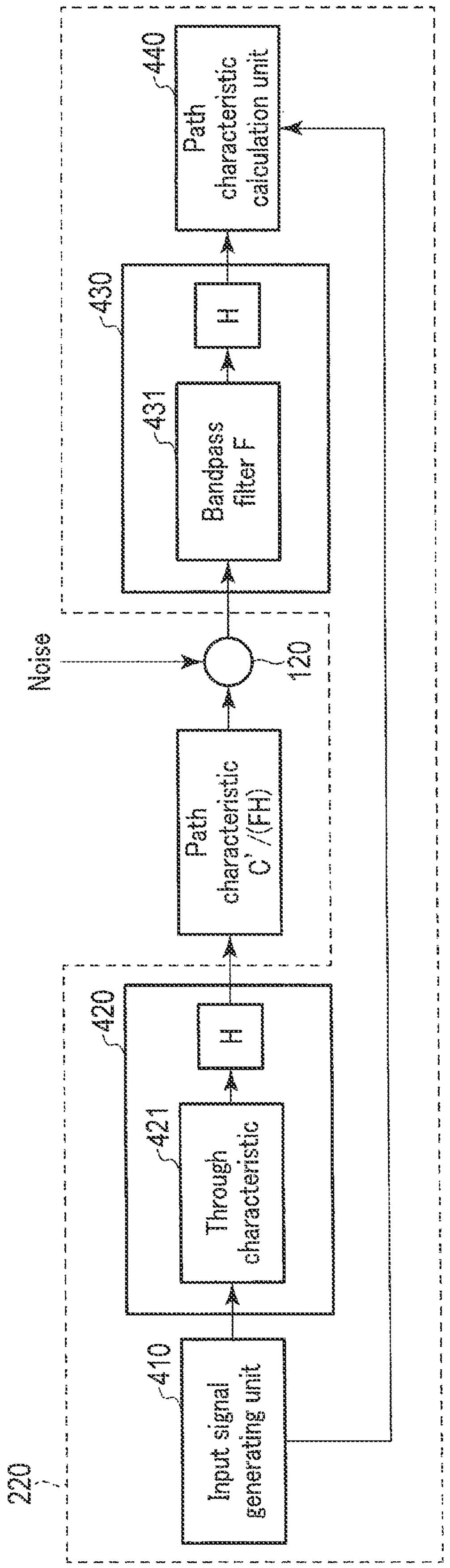
FIG. 4 is a diagram showing an example of a configuration of a path characteristic measuring unit shown in FIG. 2.

FIG. 4 schematically shows an example of a configuration of the path characteristic measuring unit 220. As shown in FIG. 4, the path characteristic measuring unit 220 includes an input signal generating unit 410, a filter 421, a bandpass filter 431, and a path characteristic calculation unit 440. The bandpass filter 431 corresponds to the control band limiting filter 221 shown in FIG. 2.

In the example shown in FIG. 4, the path characteristic measuring unit 220 is implemented by processing circuitry including two DSPs 420 and 430, a computer including a CPU, and an audio interface. The input signal generating unit 410 and the path characteristic calculation unit 440 are mounted on the computer, the filter 421 is mounted on the DSP 420, and the bandpass filter 431 is mounted on the DSP 430. The DSP 430 may be the same as the DSP 320 shown in FIG. 3. That is, one DSP may be shared by the control signal generator 210 and the path characteristic measuring unit 220. The audio interface includes a DAC and an ADC.

The computer is connected to an input port of the DSP 420 via the audio interface. An output port of the DSP 420 is connected to an input port of the loudspeaker 130. An output port of the microphone 120 is connected to an input port of the DSP 430. An output port of the DSP 430 is connected to the computer via the audio interface.

The input signal generating unit 410 generates an input signal that causes the loudspeaker 130 to output a sound for path characteristic measurement. As the input signal, for example, a white noise signal or a TSP (time stretched pulse) signal can be used.

The filter 421 has a through characteristic as a filter characteristic. The filter 421 receives the input signal from the input signal generating unit 410, and allows the input signal to pass therethrough without changing the signal characteristic thereof. The filter 421 can be implemented by, for example, an FIR filter. The DSP 420 including the filter 421 is used to measure a DSP through characteristic H.

The loudspeaker 130 receives the input signal from the input signal generating unit 410 via the DSP 420, and emits a sound based on the input signal. The microphone 120 detects a sound in the space including the sound from the loudspeaker 130 and noise to generate a detection signal. The bandpass filter 431 performs band limitation on the detection signal from the microphone 120 according to a predetermined passband. The bandpass filter 431 outputs the band-limited detection signal as an output signal.

The path characteristic calculation unit 440 receives the input signal from the input signal generating unit 410, receives the output signal from the bandpass filter 431, and calculates, from the input signal and the output signal, a path characteristic including an acoustic characteristic between the loudspeaker 130 and the microphone 120.

Figure 5:
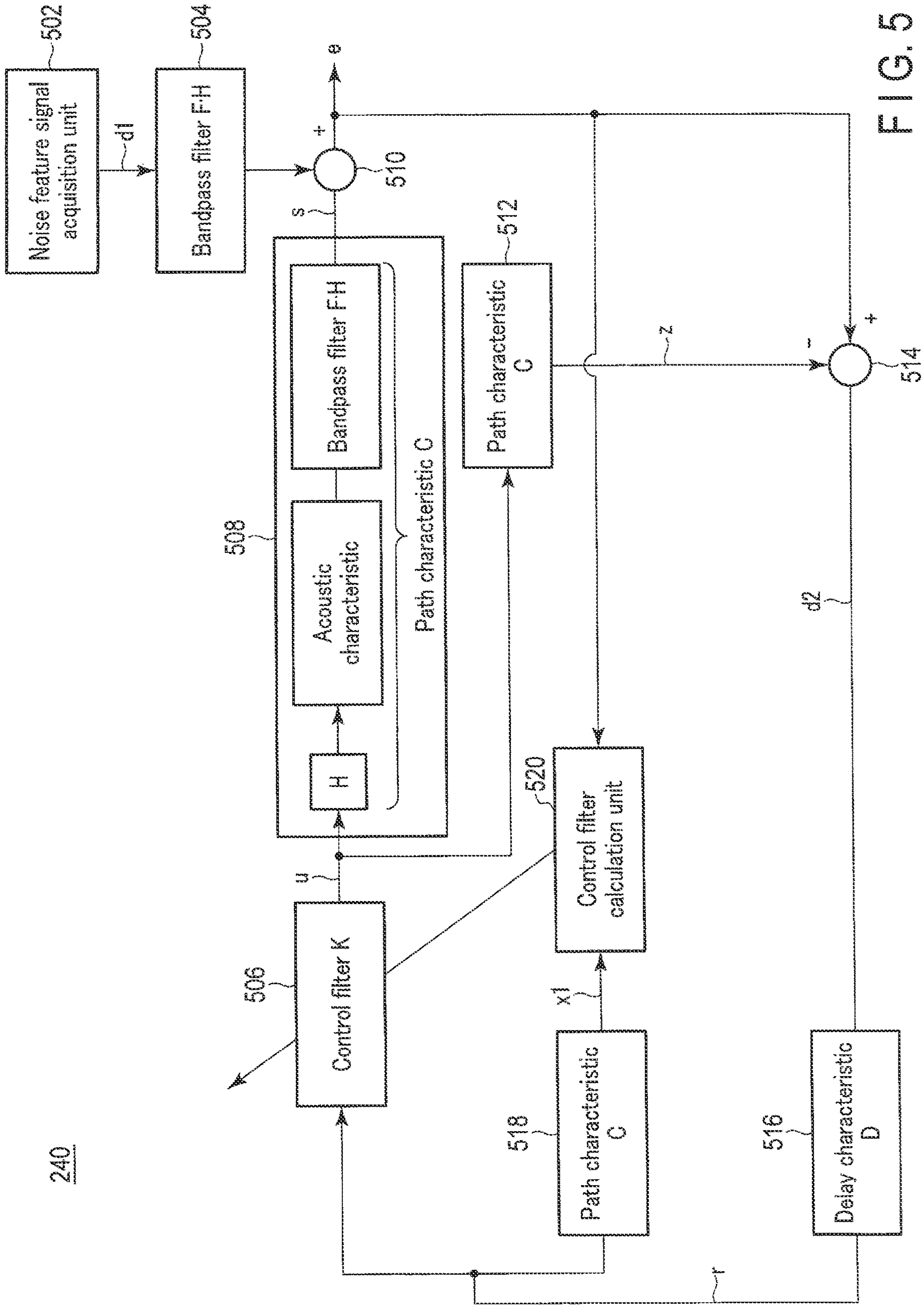
FIG. 5 is a diagram showing an example of a configuration of a control filter generating unit shown in FIG. 2.

FIG. 5 schematically shows an example of a configuration of the control filter generating unit 240. As shown in FIG. 5, the control filter generating unit 240 includes a noise feature signal acquisition unit 502, a bandpass filter 504, a control filter 506, a path filter 508, an adder 510, a path filter 512, a subtractor 514, a delay filter 516, a path filter 518, and a control filter calculation unit 520. The bandpass filter 504 and the path filter 508 correspond to the control band limiting filter 241 and the path filter 242 shown in FIG. 2, respectively. In the example shown in FIG. 5, the control filter generating unit 240 is mounted on a computer including a CPU.

The noise feature signal acquisition unit 502 acquires, as a noise feature signal d1, a signal including a feature of noise. A detection signal obtained by detecting noise with a microphone that can be different from the microphone 120 in a state where noise control is not performed is also referred to as a noise signal.

In a first example, the noise feature signal acquisition unit 502 acquires, as a noise feature signal d1, a noise signal obtained in real time by the microphone 120. In a second example, the noise feature signal acquisition unit 502 acquires, as a noise feature signal d1, a noise signal prepared in advance. Specifically, the noise signal is acquired in advance and stored in the memory 112 shown in FIG. 1. If the control filter generating unit 240 intends to generate a control filter, the noise feature signal acquisition unit 502 reads out a noise signal from the memory 112. In the first example and the second example, a noise signal is used as a noise feature signal d1 without processing the noise signal.

In a third example, the noise feature signal acquisition unit 502 specifies, from a noise signal, frequencies corresponding to peaks in the control band, generates bandpass filters having passbands centering on the specified frequencies, filters out a white noise signal with the generated bandpass filters, and adds up signals obtained by the filtering; thus, generates a noise feature signal d1. Assuming that the noise signal has peaks at f1 Hz and f2 Hz and the bandwidth of the bandpass filter is 2D Hz, the noise feature signal acquisition unit 502 generates a bandpass filter having a passband from f1−D to f1+D and a bandpass filter having a passband from f2−D to f2+D.

The bandwidth of the bandpass filter is adjusted or set to satisfy noise reduction performance. For example, blade noise generated by the rotation of blades mainly includes components of a fundamental frequency (B×f0) depending on a frequency (f0 Hz) corresponding to the rotation speed of the blades and the number of blades (B), and frequencies (B×f0×x) having values multiple times the value of the fundamental frequency. In a case where it is intended to reduce noise of three frequencies of x=1, x=2, and x=3, the bandwidth is set in a trial-and-error manner such that the noise reduction effect of the noise reduction system 100 reaches a target noise reduction level at each frequency (B×f0×x) and the bandwidth (±several hertz) is as wide as possible. In a case where the noise reduction effect of the noise reduction system 100 does not reach the target noise reduction level, the target noise reduction level is reviewed, or the order of noise reduction objects is reduced. For example, it is attempted to reduce noise of two frequencies of x=1 and x=2.

In a fourth example, the noise feature signal acquisition unit 502 specifies, from a noise signal, frequencies corresponding to peaks in the control band, and adds up a plurality of sine wave signals having a plurality of frequencies having predetermined strides in bands centering on the specified frequencies; thus, generates a noise feature signal d1. The predetermined stride may be, for example, 0.1 Hz. Assuming that the noise signal has peaks at f1 Hz and f2 Hz, the bandwidth is 2D Hz, and the predetermined stride is 0.1 Hz, the noise feature signal acquisition unit 502 adds all of a plurality of sine wave signals having frequencies of f1−D, f1−D+0.1, f1−D+0.2, . . . , f1+D−0.1, and f1+D, and a plurality of sine wave signals having frequencies of f2−D, f2−D+0.1, f2−D+0.2, . . . , f2+D−0.1, and f2+D.

The bandpass filter 504 performs band limitation on the noise feature signal d1 according to a predetermined passband. The bandpass filter 504 has a filter characteristic equivalent to the filter performance of the DSP 320 including the bandpass filter 321 shown in FIG. 3.

The control filter 506 generates a control signal u based on the band-limited noise feature signal d1.

The path filter 508 receives the control signal u from the control filter 506, and generates a control sound signal s from the control signal u. The control sound signal s indicates a result of estimating (simulating) a sound from the loudspeaker 130 included in a sound in the space detected by the microphone 120. The path filter 508 has a path characteristic C as a filter characteristic. The path characteristic C will be described later. The path filter 508 converts the control signal u into the control sound signal s according to the path characteristic C.

The adder 510 adds the band-limited noise feature signal d1 from the bandpass filter 504 and the control sound signal s from the path filter 508 to generate an error signal e. The error signal e is supplied to the subtractor 514 and the control filter calculation unit 520.

The path filter 512 receives the control signal u from the control filter 506, and generates a path characteristic signal z from the control signal u. The path filter 512 has a path characteristic C as a filter characteristic. The path filter 512 converts the control signal u into the path characteristic signal z according to the path characteristic C.

The subtractor 514 receives the error signal e from the adder 510, and receives the path characteristic signal z from the path filter 512. The subtractor 514 subtracts the path characteristic signal z from the error signal e to generate an estimated noise signal d2.

The delay filter 516 receives the estimated noise signal d2 from the subtractor 514, and delays the estimated noise signal d2 by a predetermined period of time to generate a reference signal r. The delay filter 516 has a delay characteristic D equivalent to the delay characteristic D of the delay filter 311 shown in FIG. 3. The delay filter 516 converts the estimated noise signal d2 into the reference signal r according to the delay characteristic D.

The reference signal r is supplied to the control filter 506 and the path filter 518.

The control filter 506 generates a control signal u from the reference signal r. The control filter 506 has a control characteristic K as a filter characteristic. The control filter 506 converts the reference signal r into the control signal u according to the control characteristic K.

The path filter 518 generates an auxiliary signal x1 from the reference signal r. The path filter 518 has a path characteristic C as a filter characteristic. The path filter 518 converts the reference signal r into the auxiliary signal x1 according to the path characteristic C. The auxiliary signal x1 is supplied to the control filter calculation unit 520.

The control filter calculation unit 520 receives the error signal e from the adder 510, and receives the auxiliary signal x1 from the path filter 518. The control filter calculation unit 520 calculates the control filter 506 from the error signal e and the auxiliary signal x1 according to a predetermined updating rule.

In a case where a filtered-x NLMS (normalized least mean square) algorithm known as an ANC algorithm is used, the updating rule can be expressed by Formula (1) below.

$$\theta_K(n+1) = \theta_K(n) - \frac{2\mu}{|\zeta_n|^2 + \beta} e_n \zeta_n \tag{1}$$

Here, $\theta_k$ is an FIR notation of the control characteristic K, $\zeta_n$ represents time-series data of the auxiliary signal x1 at time n, and en represents the error signal e at time n. μ is a step size in the steepest descent method, and β is an arbitrary numerical value (larger than 0), for example, 0.01.

The control filter calculation unit 520 updates the control characteristic K according to Formula (1) until the control characteristic K converges. The finally obtained control characteristic K is set in the control filter 312.

Figure 6:
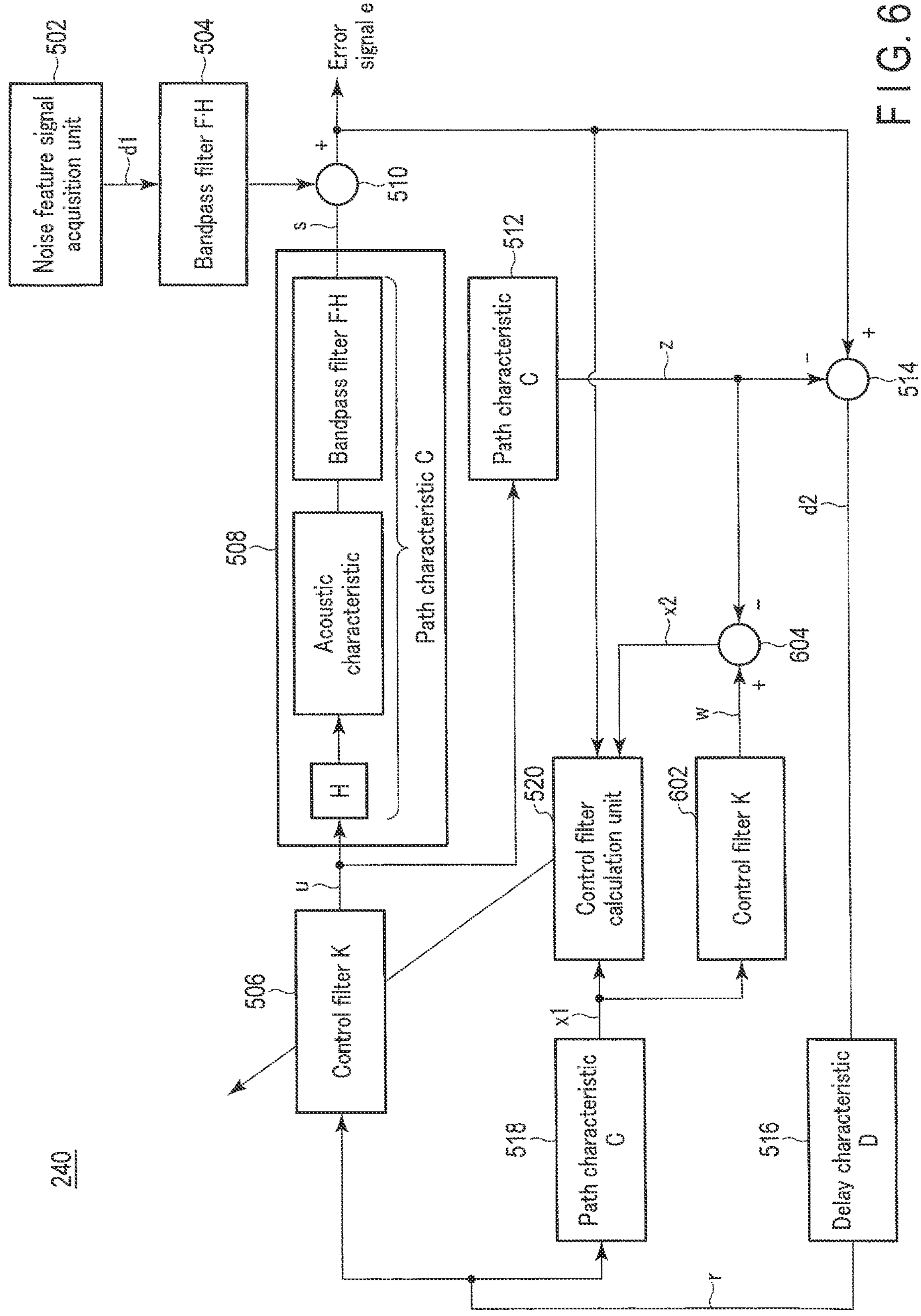
FIG. 6 is a diagram showing another example of the configuration of the control filter generating unit shown in FIG. 2.

FIG. 6 schematically shows another example of the configuration of the control filter generating unit 240. In FIG. 6, similar portions to those shown in FIG. 5 are denoted by similar reference numerals, and a repeated description is omitted. As shown in FIG. 6, the control filter generating unit 240 includes a control filter 602 and a subtractor 604 in addition to the components shown in FIG. 5.

An auxiliary signal x1 outputted from the path filter 518 is further supplied to the control filter 602. The control filter 602 receives the auxiliary signal x1 from the path filter 518, and generates a signal w from the auxiliary signal x1. The control filter 602 has a control characteristic K as a filter characteristic. The control filter 602 converts the auxiliary signal x1 into the signal w according to the control characteristic K.

A path characteristic signal z outputted from the path filter 512 is further supplied to the subtractor 604. The subtractor 604 receives the signal w from the control filter 602, and receives the path characteristic signal z from the path filter 512. The subtractor 604 subtracts the path characteristic signal z from the signal w to generate an auxiliary signal x2. The auxiliary signal x2 is supplied to the control filter calculation unit 520.

The control filter calculation unit 520 receives an error signal e from the adder 510, receives the auxiliary signal x1 from the path filter 518, and receives the auxiliary signal x2 from the subtractor 604. The control filter calculation unit 520 calculates the control filter 506 from the error signal e and the auxiliary signals x1 and x2 according to a predetermined updating rule.

In a case where an input constraint algorithm known as an ANC algorithm is used, the updating rule can be expressed by Formula (2) or (3) below.

$$\theta_K(n+1) = \theta_K(n) - 2\mu(e(n) - (z(n) - w(n)))\psi(n) \tag{2}$$

$$\theta_K(n+1) = \theta_K(n) - \frac{2\mu}{|\psi|^2 + \beta}(e(n) - (z(n) - w(n)))\psi(n) \tag{3}$$

Here, Ψ(n) represents time-series data of the auxiliary signal x1 at time n, e(n) represents the error signal e at time n, and −(z(n)−w(n)) represents the auxiliary signal x2 at time n.

The control filter calculation unit 520 updates the control characteristic K according to Formula (2) or Formula (3)

until the control characteristic K converges. The finally obtained control characteristic K is set in the control filter 312.

In the present embodiment, a fixed control filter is designed using a noise feature signal including a feature of noise. For example, a feature frequency of noise having a discrete frequency component is specified, and a control filter is designed to reduce noise of a frequency range including the specified feature frequency. The width of the frequency range can be several hertz to several tens of hertz. The control filter designed in this way makes it possible to reduce noise having a discrete frequency component. Unlike conventional fixed control filters such as those employed in noise canceling earphones, the control filter can also reduce noise of 100 Hz or more.

Furthermore, the control filter according to the present embodiment, particularly a control filter designed using a noise feature signal generated by the technique according to the third example or the fourth example described above can cope with a case where the discrete frequency fluctuates, such as fan noise, to some extent. Note that the noise feature signal needs to be set such that a discrete frequency is included in the passband of each of the control band limiting filters 211, 221, and 241.

In addition, in the present embodiment, unlike in a conventional fixed control filter design, a control filter is designed based on an ANC system of an adaptive feedback type. Therefore, even in a case where the distance between the microphone 120 and the loudspeaker 130 is sufficiently long, noise can be reduced.

Next, a method for measuring the path characteristics C and C" described above in an example in which the noise reduction system 100 is constructed using an audio interface and DSPs is described.

In the noise reduction system 100, characteristic C0, characteristic C02, characteristic C03, characteristic C0H, characteristic C1, characteristic C, characteristic C', and characteristic C" may be measured. Characteristic C0, characteristic C02, characteristic C03, and characteristic C0H may be measured in advance, and the measurement results may be stored in the memory 112 shown in FIG. 1.

Characteristic C0 indicates an audio interface through characteristic. The audio interface through characteristic indicates a characteristic of an ADC included in the audio interface and a characteristic of a DAC included in the audio interface.

Characteristic C02 indicates the audio interface through characteristic (C0) and a DSP through characteristic (H). The DSP through characteristic indicates a characteristic of an ADC included in each DSP and a characteristic of a DAC included in each DSP.

Characteristic C03 indicates the audio interface through characteristic (C0), the DSP through characteristic (H), and the DSP through characteristic (H).

Characteristic C0H indicates the audio interface through characteristic (C0), the DSP through characteristic (H), and a bandpass filter characteristic (F).

Characteristic C1 indicates the audio interface through characteristic (C0), the DSP through characteristic (H), a path characteristic, the DSP through characteristic (H), and the bandpass filter characteristic (F). The path characteristic includes a loudspeaker characteristic, a microphone characteristic, and an amplifier characteristic.

The characteristic C is obtained by dividing the C1 characteristic by the C0 characteristic, and indicates the DSP through characteristic (H), the path characteristic, the DSP through characteristic (H), and the bandpass filter characteristic (F).

The characteristic C' is obtained by dividing the C1 characteristic by the C02 characteristic, and indicates the path characteristic, the DSP through characteristic (H), and the bandpass filter characteristic (F).

The characteristic C" is obtained by dividing the C1 characteristic by the C03 characteristic, and indicates the path characteristic and the bandpass filter characteristic (F).

Figure 7A:
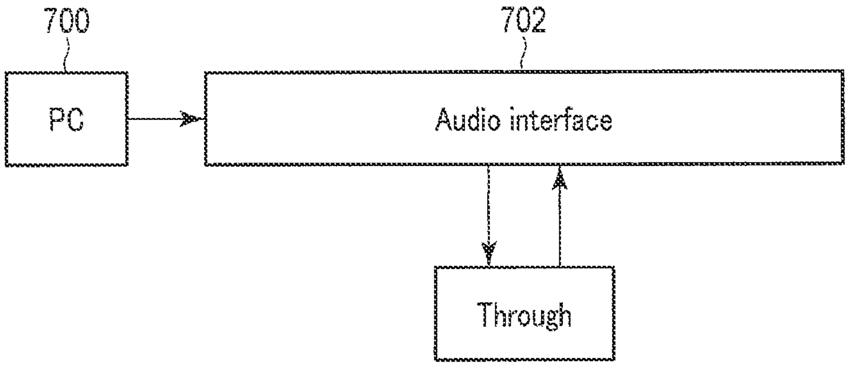
FIG. 7A is a diagram describing a technique of measuring characteristic C0 according to the embodiment.

The characteristic C0 is measured by the technique shown in FIG. 7A. In FIG. 7A, a personal computer (PC) 700 is connected to an audio interface 702. An output port of the audio interface 702 is connected to an input port of the audio interface 702 by a cable. The PC 700 supplies a first signal to the audio interface 702. As the first signal, for example, a white noise signal or a TSP signal can be used. The first signal is converted into an analog signal by a DAC in the audio interface 702, is outputted from its output port, returns to the audio interface 702 from its input port, is converted into a digital signal by an ADC in the audio interface 702, and is sent out to the PC 700 as a second signal. The PC 700 calculates the characteristic C0 from the first signal and the second signal.

Figure 7B:
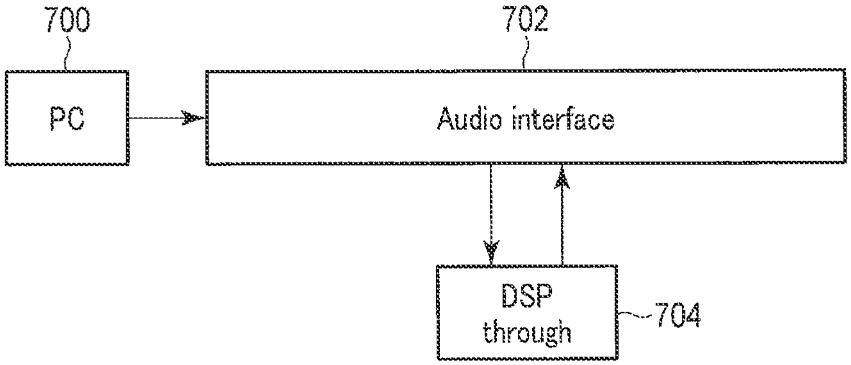
FIG. 7B is a diagram describing a technique of measuring characteristic C02 according to the embodiment.

The characteristic C02 is measured by the technique shown in FIG. 7B. In FIG. 7B, the PC 700 is connected to the audio interface 702. The output port of the audio interface 702 is connected to an input port of a DSP 704, and an output port of the DSP 704 is connected to the input port of the audio interface 702. The DSP 704 includes a filter having a through characteristic. The filter is implemented by, for example, an FIR filter. The DSP 704 corresponds to the DSP 420 shown in FIG. 4.

A first signal from the PC 700 is converted into an analog signal by the DAC in the audio interface 702, is converted into a digital signal by an ADC in the DSP 704, is filtered by the filter, is converted into an analog signal by a DAC in the DSP 704, is converted into a digital signal by the ADC in the audio interface 702, and is sent out to the PC 700 as a second signal. The PC 700 calculates the characteristic C02 from the first signal and the second signal.

Figure 7C:
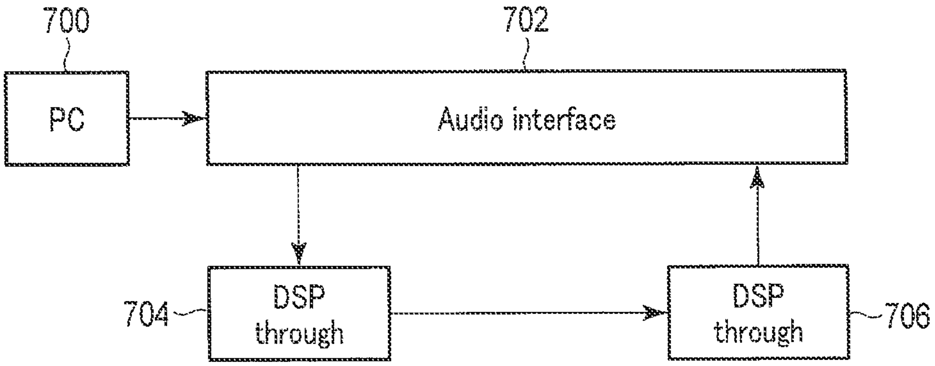
FIG. 7C is a diagram describing a technique of measuring characteristic C03 according to the embodiment.

The characteristic C03 is measured by the technique shown in FIG. 7C. In FIG. 7C, the PC 700 is connected to the audio interface 702. The output port of the audio interface 702 is connected to the input port of the DSP 704, the output port of the DSP 704 is connected to an input port of a DSP 706, and an output port of the DSP 706 is connected to the input port of the audio interface 702. The DSP 706 is a DSP equivalent to the DSP 704.

A first signal from the PC 700 is converted into an analog signal by the DAC in the audio interface 702, is converted into a digital signal by the ADC in the DSP 704, is filtered by the filter of the DSP 704, is converted into an analog signal by the DAC in the DSP 704, is converted into a digital signal by an ADC in the DSP 706, is filtered by a filter of the DSP 706, is converted into an analog signal by a DAC in the DSP 706, is converted into a digital signal by the ADC in the audio interface 702, and is sent out to the PC 700 as a second signal. The PC 700 calculates the characteristic C03 from the first signal and the second signal.

Figure 7D:
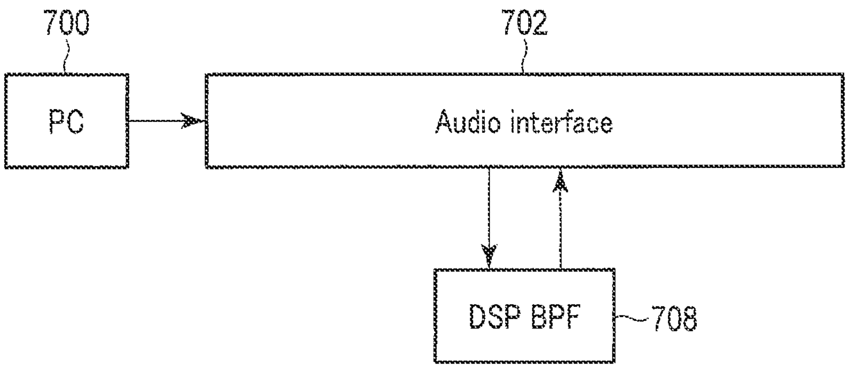
FIG. 7D is a diagram describing a technique of measuring characteristic C0H according to the embodiment.

The characteristic C0H is measured by the technique shown in FIG. 7D. In FIG. 7D, the PC 700 is connected to the audio interface 702. The output port of the audio interface 702 is connected to an input port of a DSP 708, and an output port of the DSP 708 is connected to the input port of the audio interface 702. The DSP 708 includes a bandpass filter. The DSP 708 corresponds to the DSP 320 shown in FIG. 3 and the DSP 430 shown in FIG. 4.

A first signal from the PC 700 is converted into an analog signal by the DAC in the audio interface 702, is converted into a digital signal by an ADC in the DSP 708, is filtered by the bandpass filter, is converted into an analog signal by a DAC in the DSP 708, is converted into a digital signal by the ADC in the audio interface 702, and is sent out to the PC 700 as a second signal. The PC 700 calculates the characteristic C0H from the first signal and the second signal.

Figure 7E:
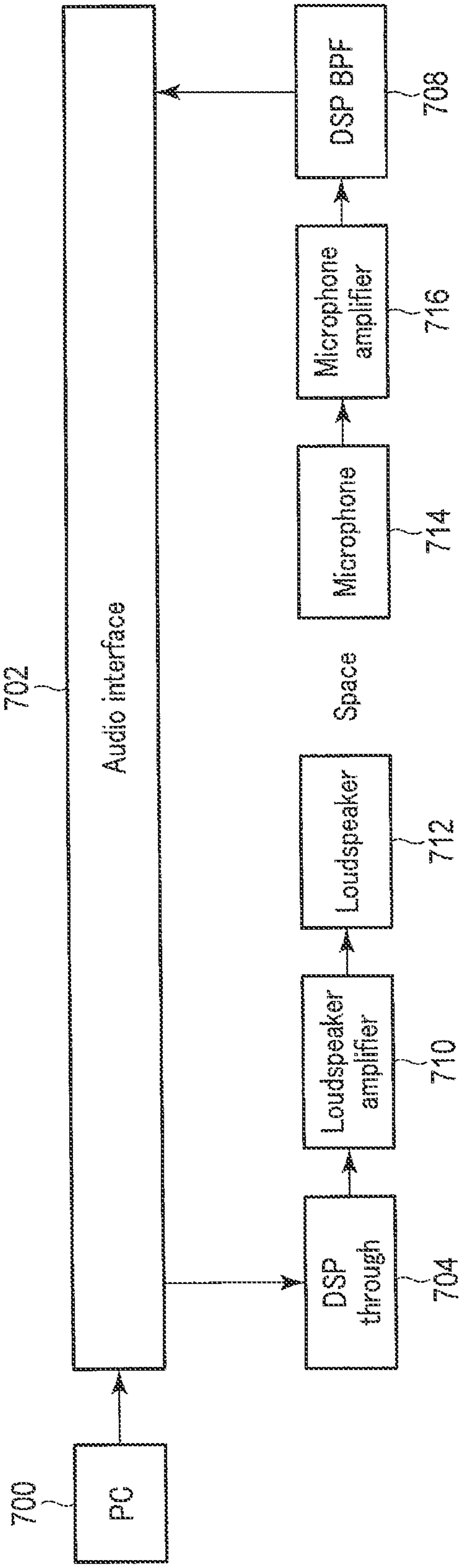
FIG. 7E is a diagram describing a technique of measuring characteristic C1 according to the embodiment.

The characteristic C1 is measured by the technique shown in FIG. 7E. The characteristic C1 is measured in the path characteristic measurement mode. The technique shown in FIG. 7E corresponds to the method for measuring the path characteristic described with reference to FIG. 4.

In FIG. 7E, the PC 700 is connected to the audio interface 702. The output port of the audio interface 702 is connected to the input port of a DSP 704, the output port of the DSP 704 is connected to an input port of a loudspeaker amplifier 710, and an output port of the loudspeaker amplifier 710 is connected to an input port of a loudspeaker 712. An output port of a microphone 714 is connected to an input port of a microphone amplifier 716, an output port of the microphone amplifier 716 is connected to the input port of the DSP 708, and the output port of the DSP 708 is connected to the input port of the audio interface 702. The loudspeaker 712 and the microphone 714 correspond to the loudspeaker 130 and the microphone 120 shown in FIG. 2, respectively.

A first signal from the PC 700 is converted into an analog signal by the DAC in the audio interface 702, is converted into a digital signal by the ADC in the DSP 704, is filtered by the filter of the DSP 704, is converted into an analog signal by the DAC in the DSP 704, is amplified by the loudspeaker amplifier 710, and is converted into a sound by the loudspeaker 712. The sound from the loudspeaker 712 is converted into an electric signal by the microphone 714. The electric signal is amplified by the microphone amplifier 716, is converted into a digital signal by the ADC in the DSP 708, is filtered by the bandpass filter of the DSP 708, is converted into an analog signal by the DAC in the DSP 708, is converted into a digital signal by the ADC in the audio interface 702, and is sent out to the PC 700 as a second signal. The PC 700 calculates the characteristic C1 from the first signal and the second signal.

The PC 700 calculates the characteristic C from the characteristic C1 and the characteristic C0. Specifically, the PC 700 obtains the characteristic C by dividing the characteristic C1 by the characteristic C0. The PC 700 calculates the characteristic C' from the characteristic C1 and the characteristic C02. Specifically, the PC 700 obtains the characteristic C' by dividing the characteristic C1 by the characteristic C02. The PC 700 calculates the characteristic C" from the characteristic C1 and the characteristic C03. Specifically, the PC 700 obtains the characteristic C" by dividing the characteristic C1 by the characteristic C03.

The characteristic C measured as described above is used in the control filter generating unit 240. The characteristic C" measured as described above is used in the control signal generator 210.

Next, a result of testing the effect of the noise reduction technique according to the present embodiment is described.

Figure 8:
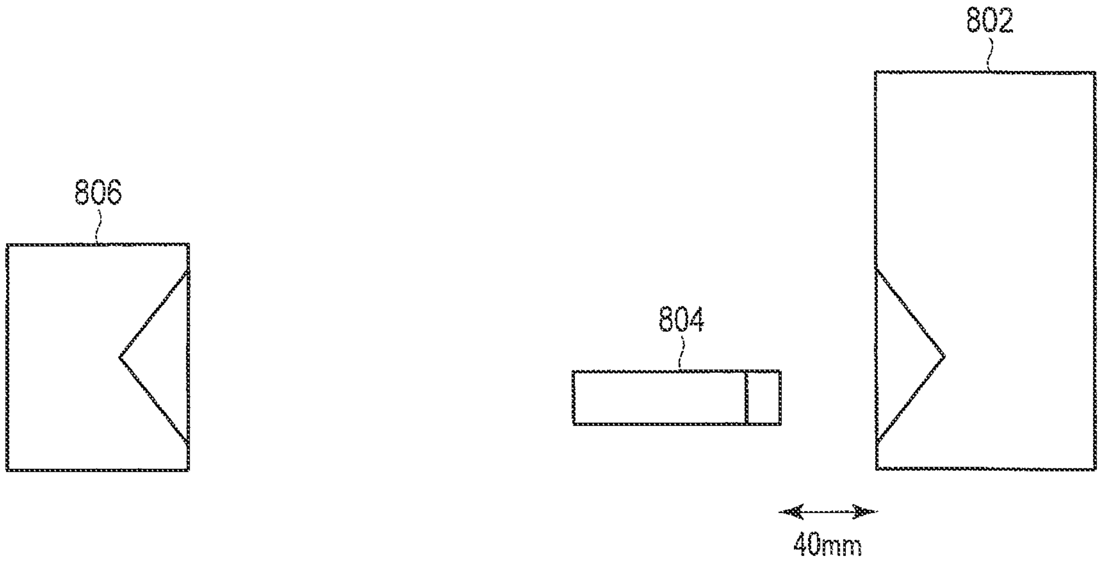
FIG. 8 is a diagram showing a device arrangement in a case where an effect of a noise reduction technique according to the present embodiment is tested.

FIG. 8 schematically shows a device arrangement in a case where the effect of the noise reduction technique according to the present embodiment is tested. As shown in FIG. 8, in each test, the distance between a loudspeaker 802 for noise control and a microphone 804 was set to 40 mm, and a loudspeaker 806 was used as a noise source. The loudspeaker 802, the microphone 804, and the loudspeaker 806 correspond to the loudspeaker 130, the microphone 120, and the noise source 150 shown in FIG. 1, respectively. In addition, a DSP having a delay of several milliseconds was used as a system delay (characteristic H).

Figure 9:
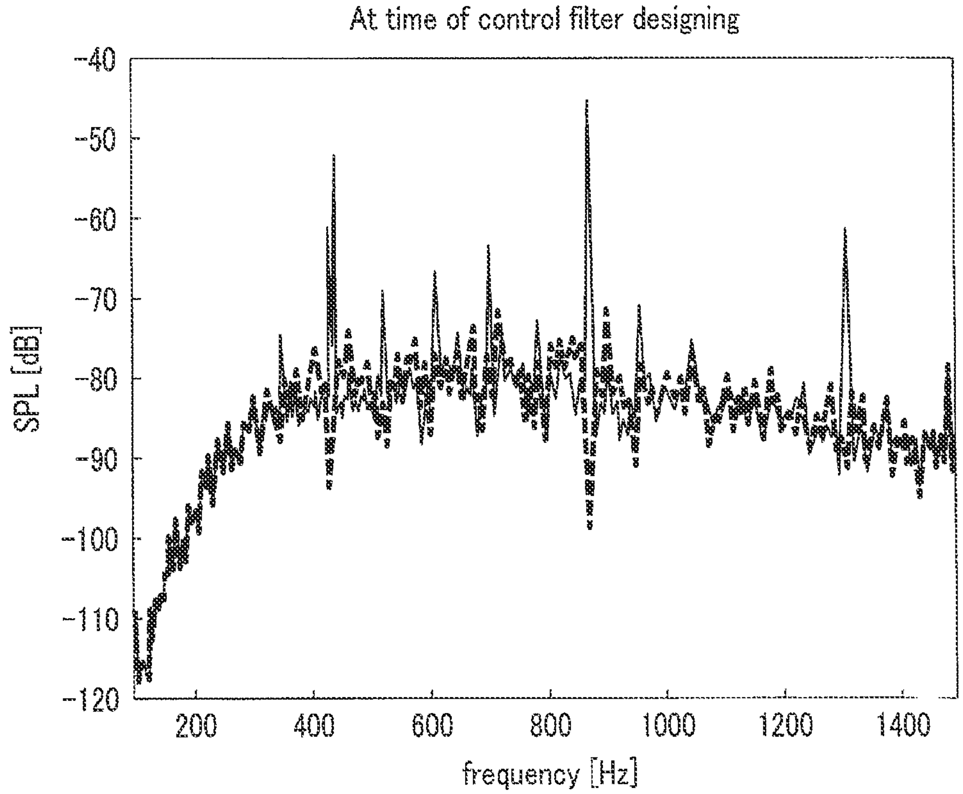
FIG. 9 is a diagram showing a noise feature signal used for a first test.
Figure 10:
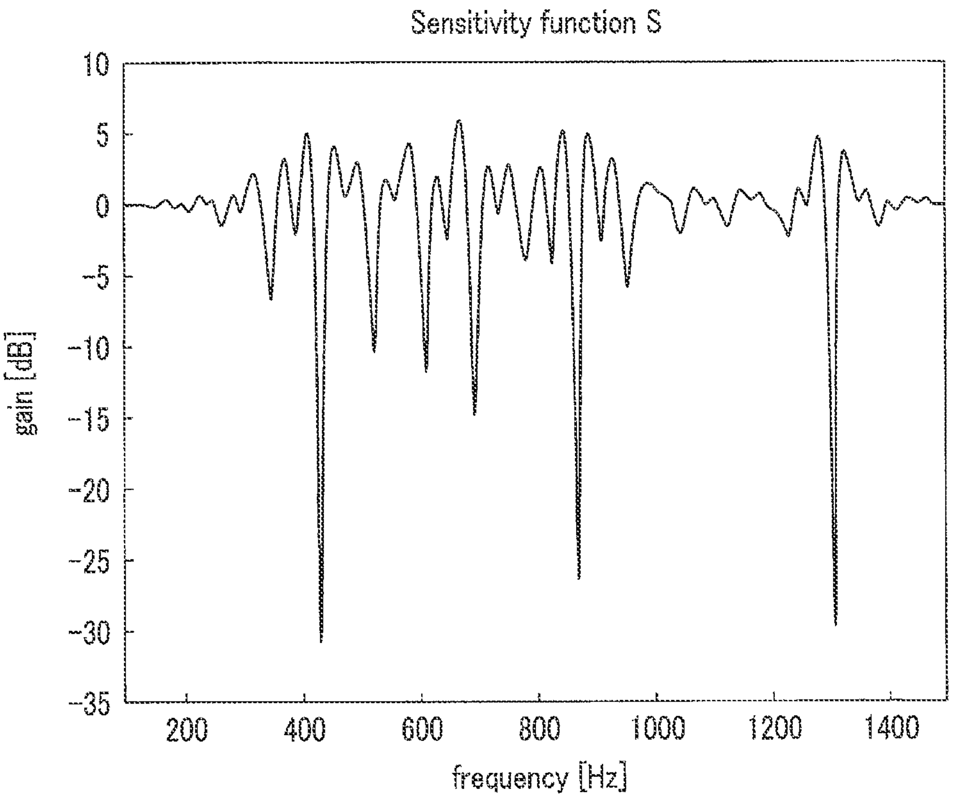
FIG. 10 is a diagram showing a sensitivity function according to the first test.

In a first test, a noise feature signal acquired according to the first example described above was used. That is, a detection signal obtained by detecting noise outputted from the loudspeaker 806 with the microphone 804 was used as the noise feature signal. The noise feature signal according to the first test is shown in FIG. 9. In FIG. 9, the solid line represents the noise feature signal according to the first test, and the broken line represents a simulation result of noise reduction at the time of control filter designing. The simulation result of noise reduction at the time of control filter designing corresponds to the error signal e shown in FIG. 5. A sensitivity function according to the first test is shown in FIG. 10.

Figure 11:
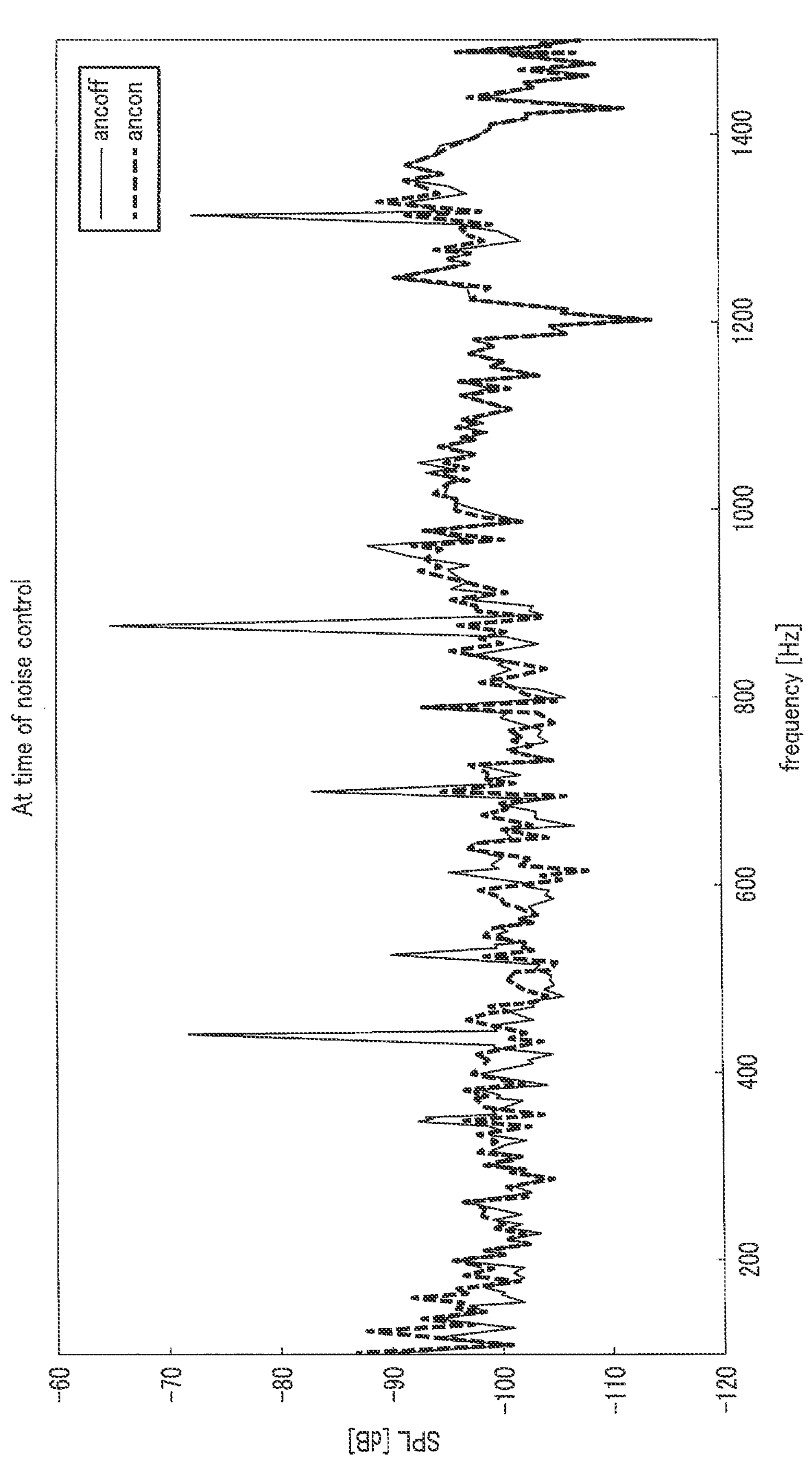
FIG. 11 is a diagram showing an effect of the noise reduction technique according to the first test.

FIG. 11 shows a result of testing the effect of the noise reduction technique according to the first test. In FIG. 11, the solid line represents a detection signal from the microphone 804 in a case where noise control was not performed, and the broken line represents a detection signal (error signal) from the microphone 804 in a case where noise control was performed. From FIG. 11, it can be seen that noise is successfully reduced at feature frequencies of the noise. It can also be seen that, unlike in a conventional fixed control filter design, noise of 100 Hz or more is successfully reduced.

Figure 12:
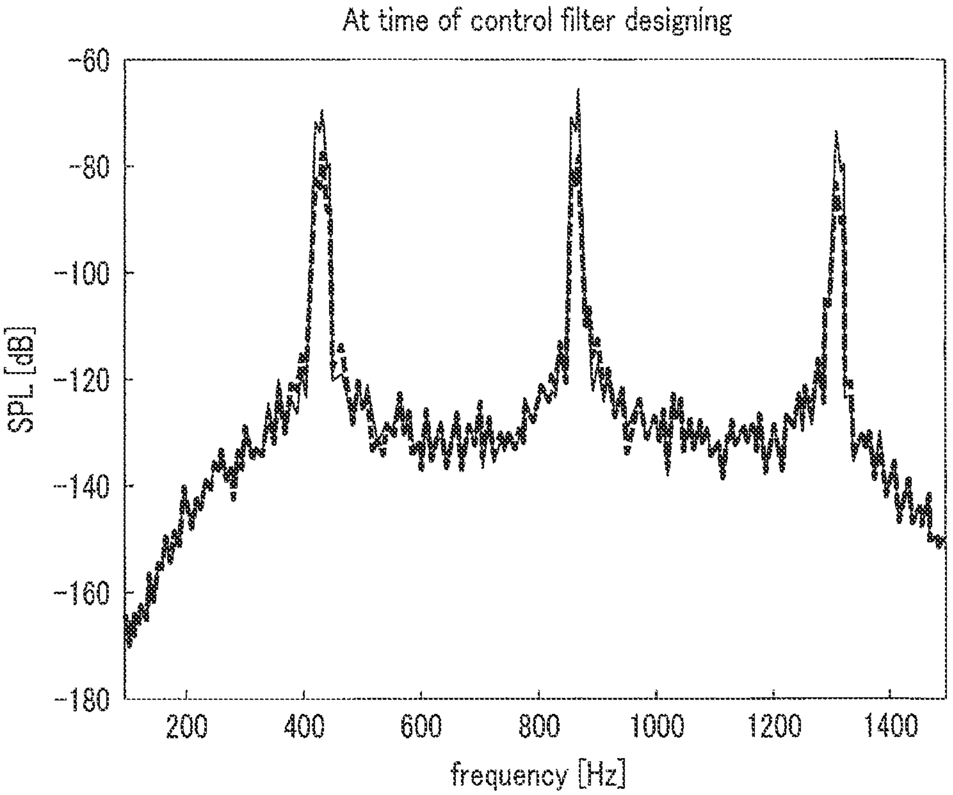
FIG. 12 is a diagram showing a noise feature signal used for a second test.
Figure 13:
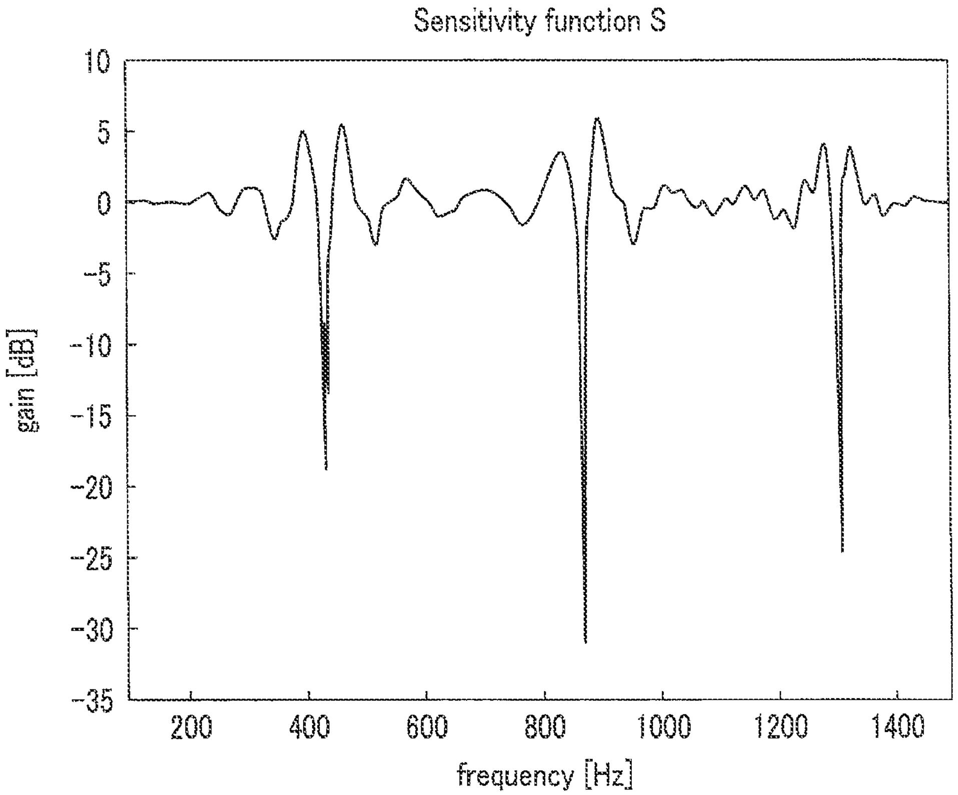
FIG. 13 is a diagram showing a sensitivity function according to the second test.

In a second test, a noise feature signal acquired according to the third example described above was used. That is, a noise feature signal generated by specifying frequencies corresponding to peaks in a control band from a detection signal obtained by detecting noise outputted from the loudspeaker 806 with the microphone 804, generating bandpass filters having bands centering on the specified frequencies, filtering a white noise signal with the generated bandpass filters, and adding up signals obtained by the filtering is used. The noise feature signal according to the second test is shown in FIG. 12. In FIG. 12, the solid line represents the noise feature signal according to the second test, and the broken line represents a simulation result of noise reduction at the time of control filter designing. A sensitivity function according to the second test is shown in FIG. 13.

Figure 14:
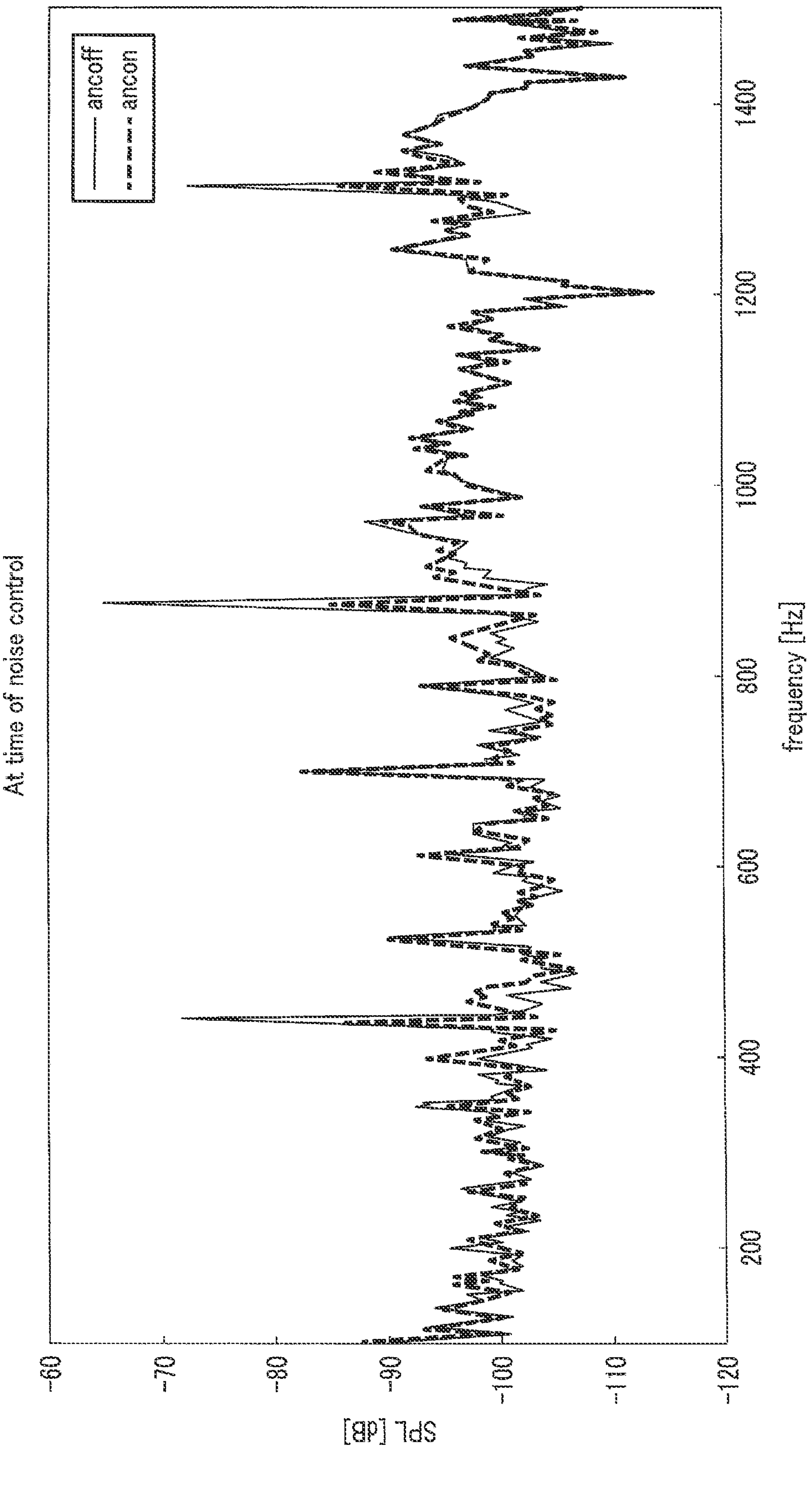
FIG. 14 is a diagram showing an effect of the noise reduction technique according to the second test.

FIG. 14 shows a result of testing the effect of the noise reduction technique according to the second test. In FIG. 14, the solid line represents a detection signal from the microphone 804 in a case where noise control was not performed, and the broken line represents a detection signal (error signal) from the microphone 804 in a case where noise control is performed. From FIG. 14, it can be seen that noise is successfully reduced at feature frequencies of the noise. It can also be seen that, unlike in a conventional fixed control filter design, noise of 100 Hz or more is successfully reduced.

Figure 15:
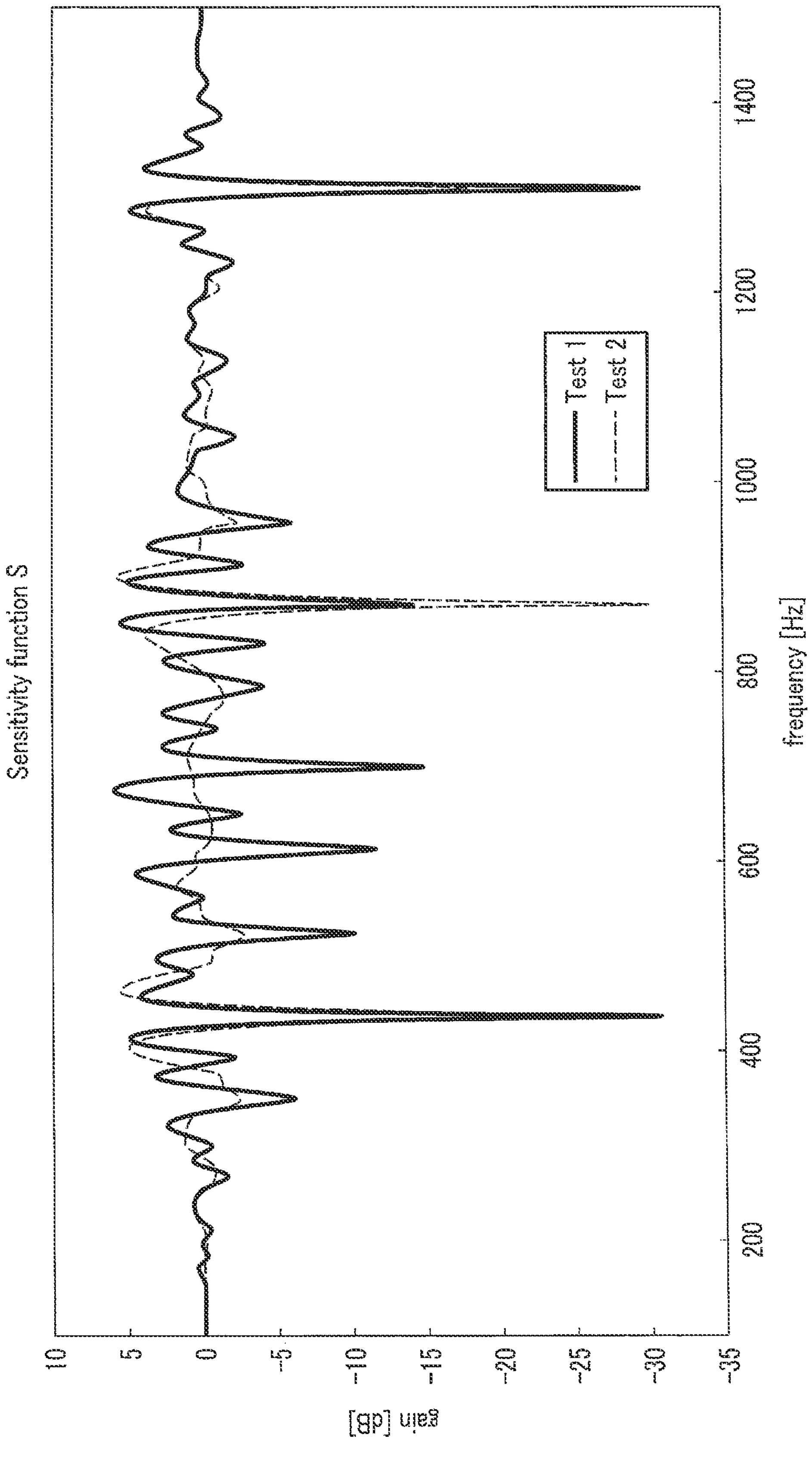
FIG. 15 is a diagram showing a comparison between control performance according to the first test and control performance according to the second test.
Figure 16A:
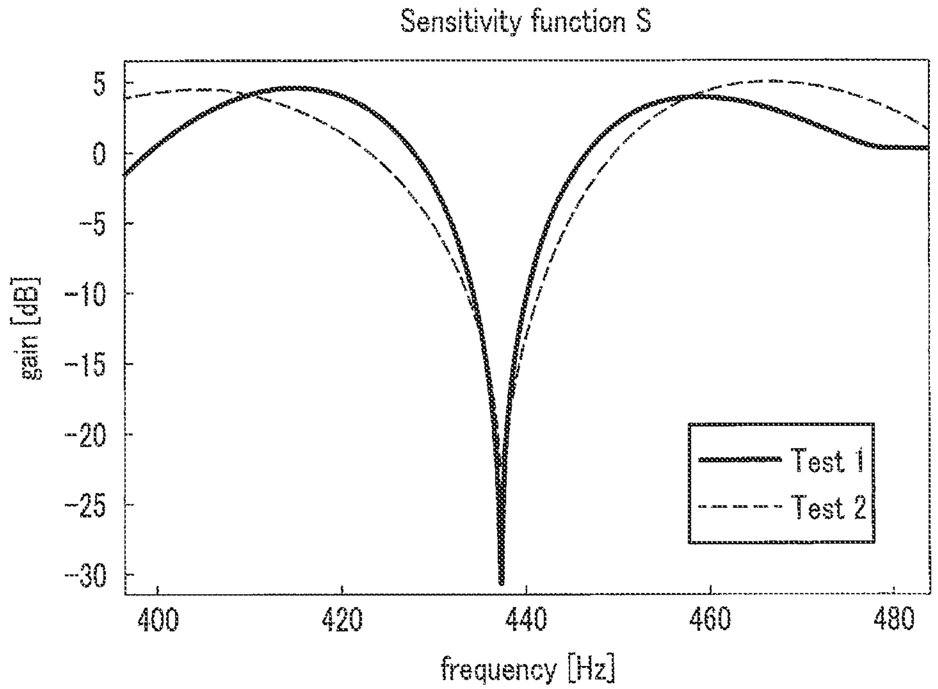
FIG. 16A is an enlarged diagram of a portion of the graph shown in FIG. 15.
Figure 16B:
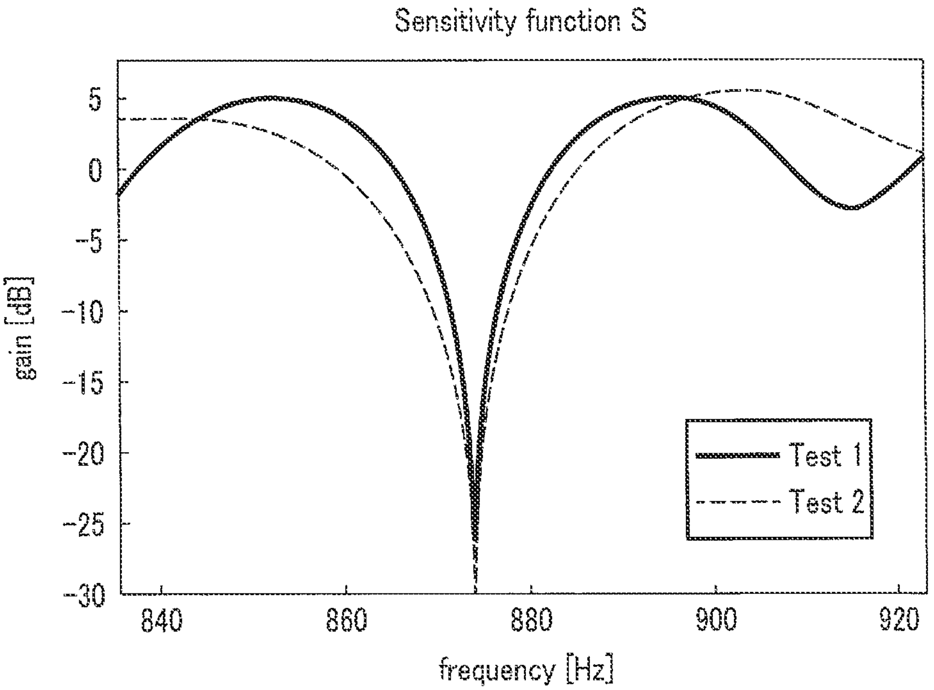
FIG. 16B is an enlarged diagram of another portion of the graph shown in FIG. 15.
Figure 16C:
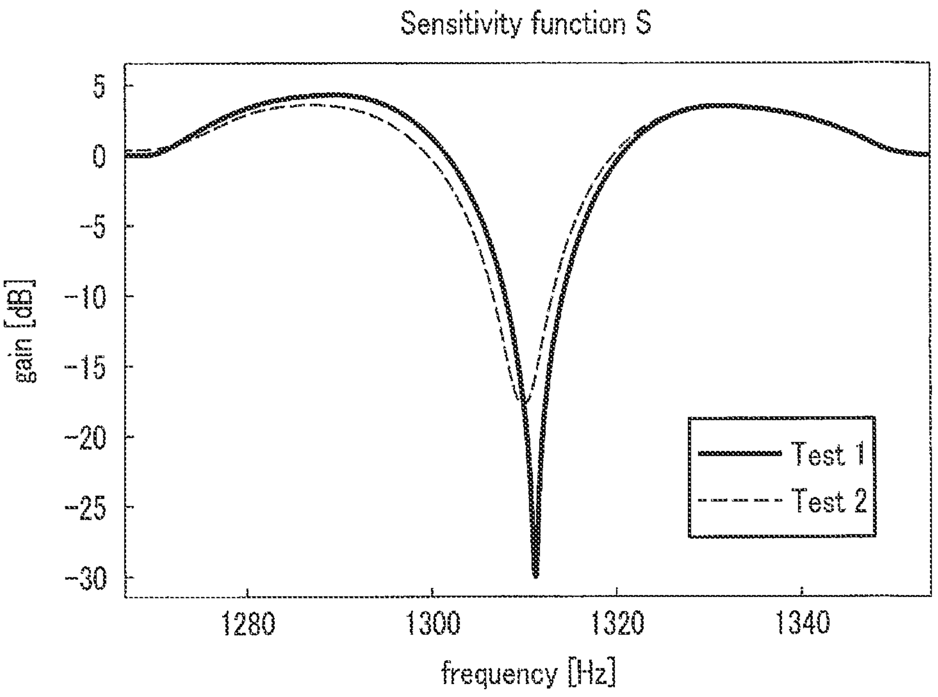
FIG. 16C is an enlarged diagram of another portion of the graph shown in FIG. 15.

FIG. 15 schematically shows control performance according to the first test and control performance according to the second test. FIG. 16A, FIG. 16B, and FIG. 16C are partially enlarged diagrams of FIG. 15. In FIG. 15, FIG. 16A, FIG. 16B, and FIG. 16C, the solid line represents control performance according to the first test, and the broken line represents control performance according to the second test. As shown in FIG. 16A, at 437 Hz, the 6 dB reduction performance according to the first test ranges from 433 Hz to 441 Hz, and the 6 dB reduction performance according to the second test ranges from 431 Hz to 443 Hz. Thus, the 6 dB reduction bandwidth according to the second test is about 4 Hz wider than the 6 dB reduction bandwidth according to the first test. As shown in FIG. 16B, at 874 Hz, the 6 dB reduction performance according to the first test ranges from 870 Hz to 878 Hz, and the 6 dB reduction performance according to the second test ranges from 867.3 Hz to 879.6 Hz. Thus, the 6 dB reduction bandwidth according to the second test is about 4.3 Hz wider than the 6 dB reduction bandwidth according to the first test. As shown in FIG. 16C, at 1312 Hz, the 6 dB reduction bandwidth according to the second test is substantially the same as the 6 dB reduction bandwidth according to the first test.

From FIG. 15 to FIG. 16C, it can be seen that the configuration using a noise feature signal acquired according to the third example can cope with the fluctuation of discrete frequencies more than the configuration using a noise feature signal acquired according to the first example.

A third test is a test in which a delay time was given to the path characteristic in the second test. Specifically, the distance between the loudspeaker 802 and the microphone 804 was increased by 1 m or 2 m, and a noise feature signal obtained in a similar manner to the second test was used.

Figure 17:
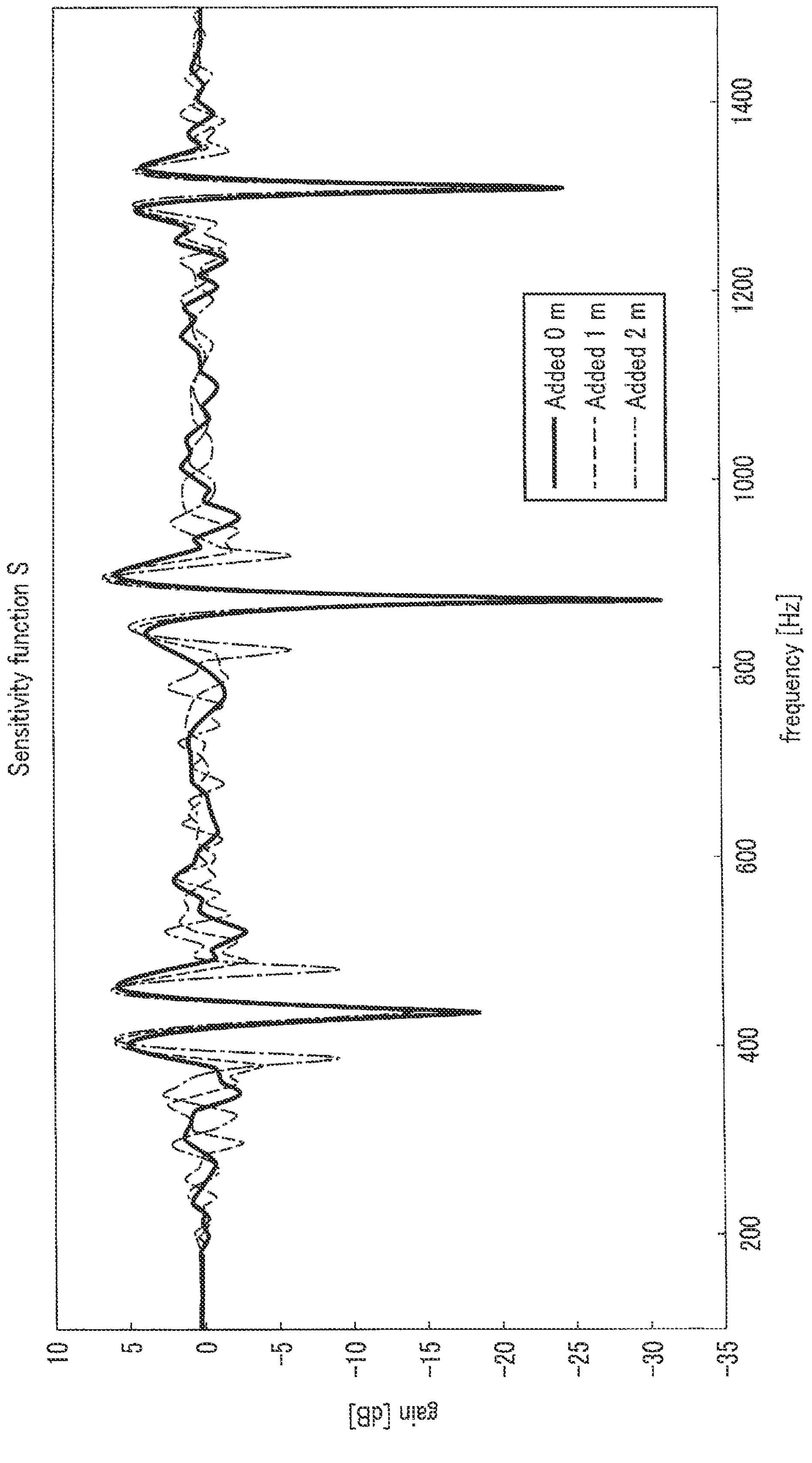
FIG. 17 is a diagram showing a comparison between control performance according to the second test and control performance according to a third test.
Figure 18A:
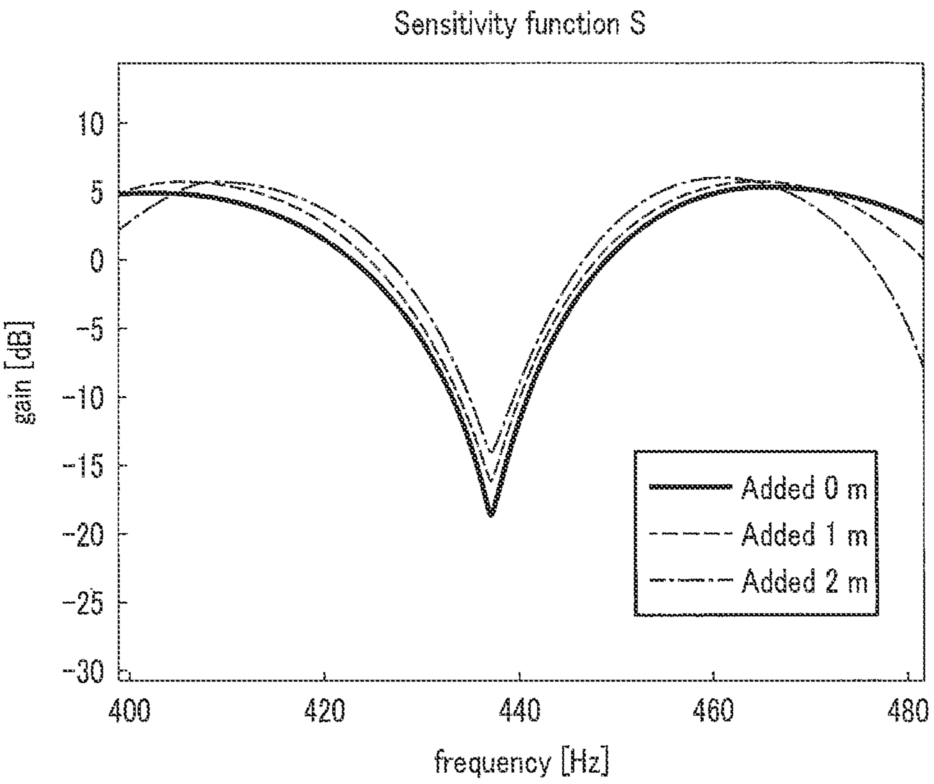
FIG. 18A is an enlarged diagram of a portion of the graph shown in FIG. 17.
Figure 18B:
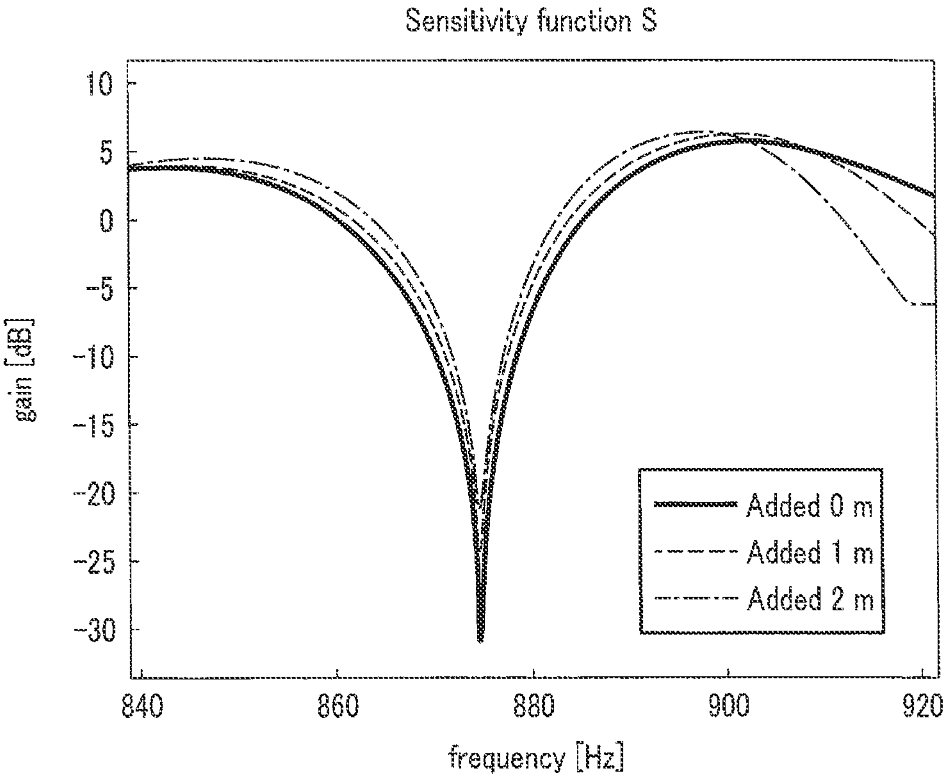
FIG. 18B is an enlarged diagram of another portion of the graph shown in FIG. 17.
Figure 18C:
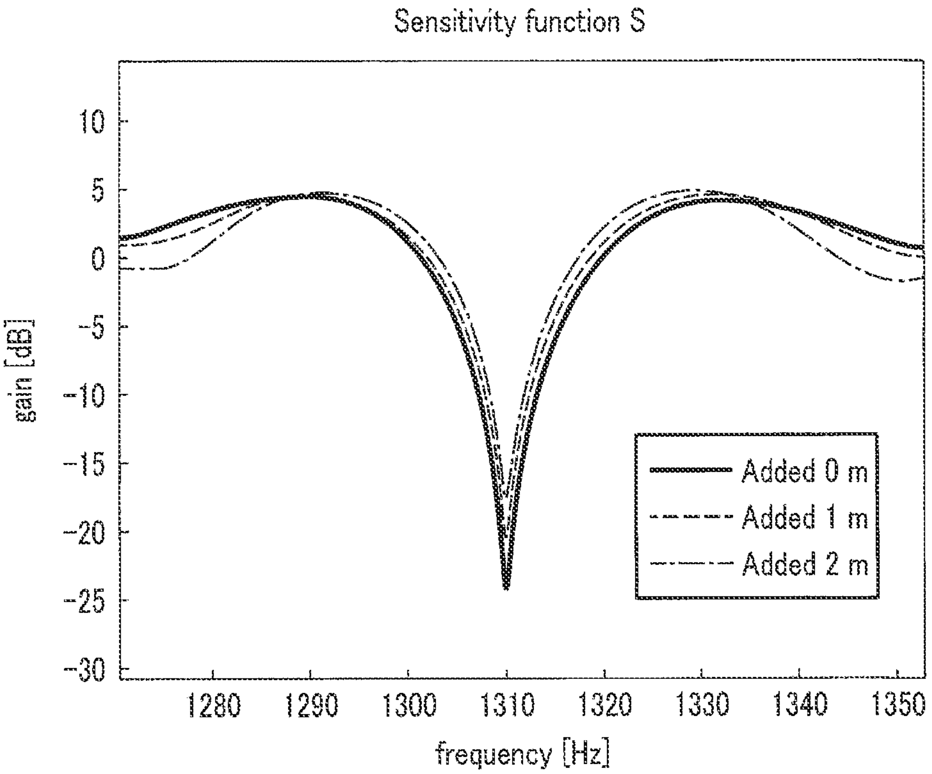
FIG. 18C is an enlarged diagram of another portion of the graph shown in FIG. 17.

FIG. 17 shows control performance according to the second test and control performance according to the third test. FIG. 18A, FIG. 18B, and FIG. 18C are partially enlarged diagrams of FIG. 17. In FIG. 17, FIG. 18A, FIG. 18B, and FIG. 18C, the solid line represents control performance according to the second test, and the broken line and the alternate long and short dash line represent control performance according to the third test. From FIG. 17 to FIG. 18C, it can be seen that sufficient noise reduction is possible even if the distance between the loudspeaker 802 and the microphone 804 is increased by 2 m.

In the configuration shown in FIG. 2, the control filter generating unit 240 is provided in the signal processing device 110. The control filter generating unit 240 may be provided outside the signal processing device 110.

Figure 19:
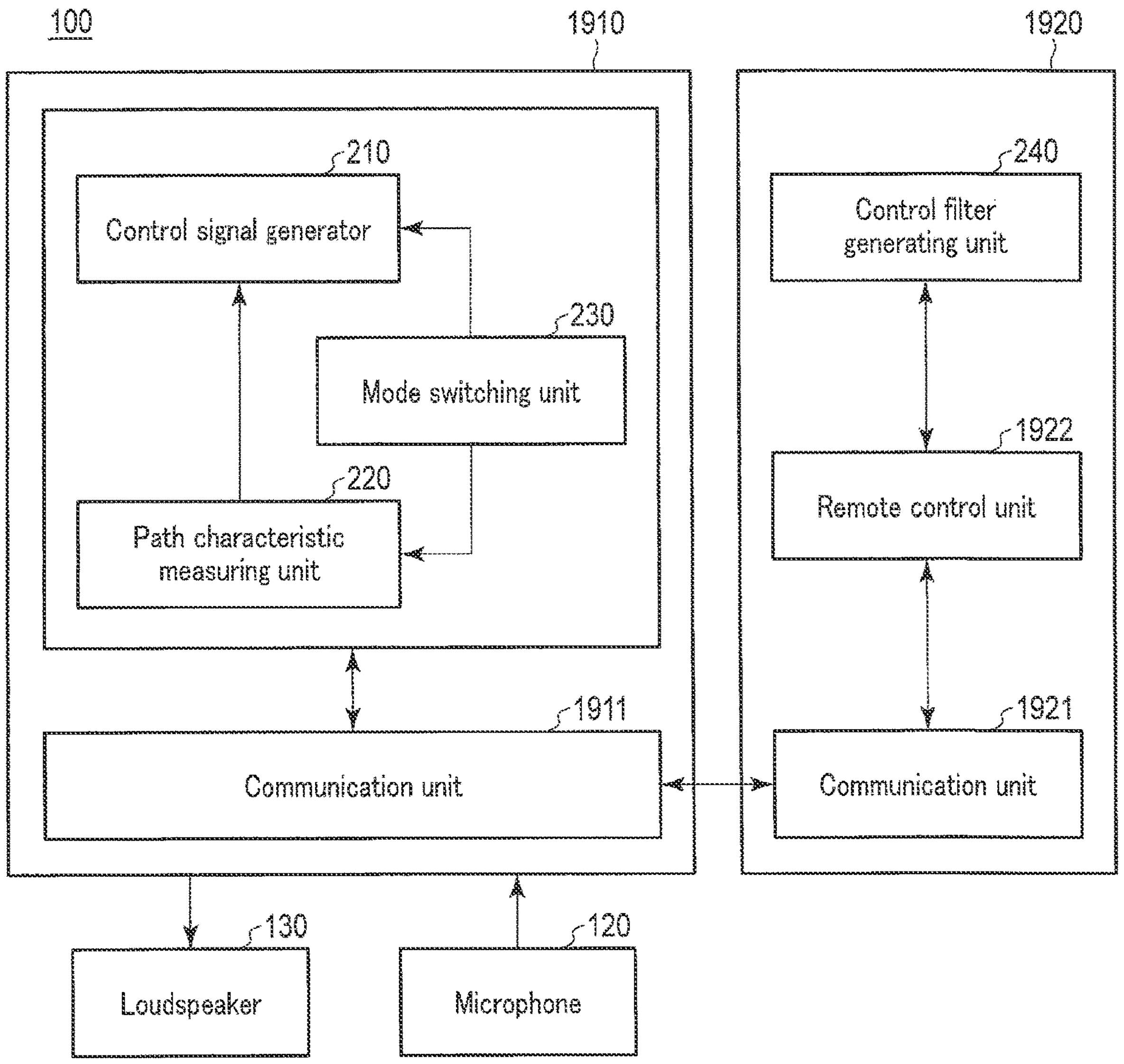
FIG. 19 is a diagram showing a modification of the noise reduction system according to the embodiment.

FIG. 19 schematically shows a modification of the noise reduction system 100. In FIG. 19, similar portions to those shown in FIG. 1 and FIG. 2 are denoted by similar reference numerals, and a repeated description is omitted. In the example shown in FIG. 19, the noise reduction system 100 includes a signal processing device 1910, a remote control device 1920, a microphone 120, and a loudspeaker 130. The signal processing device 1910 is connected to the microphone 120 and the loudspeaker 130. The signal processing device 1910 is connected to be capable of communicating with the remote control device 1920. Communication between the signal processing device 1910 and the remote control device 1920 may be wired communication, or may be wireless communication.

The signal processing device 1910 includes a control signal generator 210, a path characteristic measuring unit 220, a mode switching unit 230, and a communication unit 1911. The communication unit 1911 communicates with the remote control device 1920. The communication unit 1911 is implemented by a communication interface such as a wireless module.

The remote control device 1920 includes a control filter generating unit 240, a communication unit 1921, and a remote control unit 1922. The communication unit 1921 communicates with the signal processing device 1910. The remote control unit 1922 remotely controls the signal processing device 1910. The remote control device 1920 can be a computer (e.g., a PC) including a CPU, a memory, and a communication interface.

The remote control unit 1922 remotely controls the mode switching unit 230. In other words, the remote control unit 1922 remotely controls the switching of the operating mode. For example, the remote control unit 1922 generates a switching signal for switching the operating mode from a control mode to a path characteristic measurement mode, and transmits the switching signal to the signal processing device 1910 via the communication unit 1921. The mode switching unit 230 receives the switching signal from the remote control device 1920 via the communication unit 1911, and switches the operating mode from the control mode to the path characteristic measurement mode according to the switching signal.

The remote control unit 1922 receives, from the signal processing device 1910 via the communication unit 1921, a measurement result of the path characteristic obtained by the path characteristic measuring unit 220. Furthermore, the remote control unit 1922 receives a noise signal from the signal processing device 1910 via the communication unit 1921. The control filter generating unit 240 receives the measurement result of the path characteristic and the noise signal from the remote control unit 1922, and generates a control filter based on the measurement result of the path characteristic and the noise signal. The control filter generating unit 240 delivers control filter information indicating the generated control filter (for example, a control characteristic K) to the remote control unit 1922. The remote control unit 1922 transmits the control filter information to the signal processing device 1910 via the communication unit 1921.

The mode switching unit 230 receives the control filter information from the remote control device 1920 via the communication unit 1911. The mode switching unit 230 sets, in the control signal generator 210, the control filter indicated by the control filter information, and switches the operating mode from the path characteristic measurement mode to the control mode.

Thus, the remote control device 1920 is configured to remotely set a control filter for the signal processing device 1910.

The remote control device 1920 may be further configured to remotely set a control band limiting filter for the signal processing device 1910. For example, the remote control unit 1922 determines a control band based on the noise signal received from the signal processing device 1910. Specifically, the remote control unit 1922 specifies, from the noise signal, a frequency corresponding to a peak exceeding a predetermined sound pressure level, and determines, as the control band, a frequency band including the specified frequency. Alternatively, the remote control unit 1922 may determine a control band based on an input from a human operator. The remote control unit 1922 transmits control band information indicating the control band to the signal processing device 1910 via the communication unit 1921. The signal processing device 1910 receives the control band information from the remote control device 1920, and sets, in a control band limiting filter, the control band indicated by the control band information.

The remote control device 1920 may be configured to monitor the noise reduction effect in the control mode and in response to the noise reduction effect falls below a target noise reduction level, generate (update) a control filter. For example, the remote control unit 1922 receives, from the signal processing device 1910 via the communication unit 1921, an error signal obtained in the control mode and an estimated noise signal obtained in the control mode. The remote control unit 1922 periodically compares the signal characteristic of the error signal and the signal characteristic of the estimated noise signal, and monitors whether the noise reduction effect of the system has reached a target noise reduction level or not. In another example, the remote control unit 1922 receives, from the signal processing device 1910 via the communication unit 1921, an error signal obtained in the control mode and a detection signal obtained by a microphone during a period when the control mode is off. The remote control unit 1922 periodically compares the signal characteristic of the error signal and the signal characteristic of the detection signal, and monitors whether the noise reduction effect of the system has reached a target noise reduction level or not.

In another example, the path characteristic calculation unit 440 included in the path characteristic measuring unit 220 may be provided in the remote control device 1920. That is, the remote control device 1920 may be configured to further calculate a path characteristic. In this example, the path characteristic measuring unit 220 converts an output signal of the DSP 430 shown in FIG. 4 into a digital signal, and transmits the digital signal to the remote control device 1920 via the communication unit 1911. The remote control device 1920 receives an output signal from the signal processing device 1910, and calculates a path characteristic based on the received output signal. The remote control device 1920 transmits the calculation result of the path characteristic to the signal processing device 1910.

Figure 20:
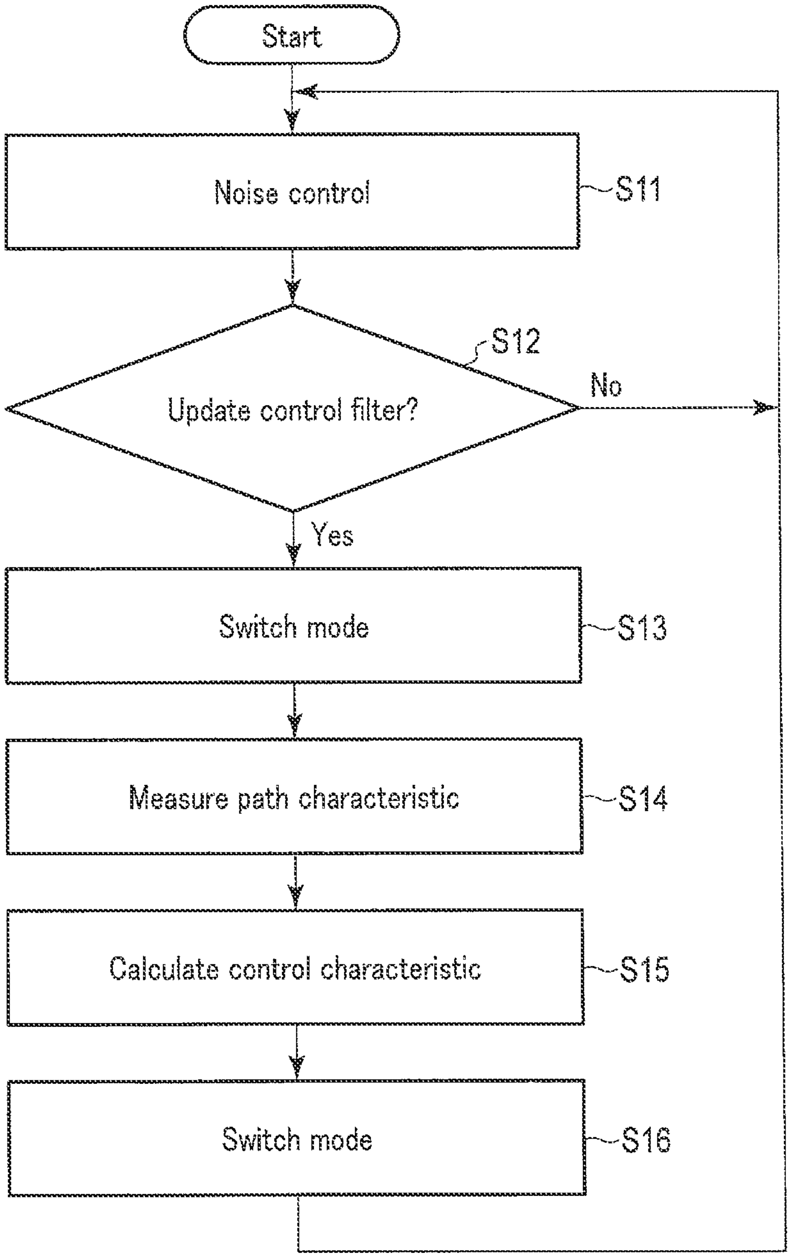
FIG. 20 is a flowchart showing an operation example of the noise reduction system according to the embodiment.

FIG. 20 schematically shows an example of a procedure of a noise reduction method executed by the noise reduction system 100 having the configuration shown in FIG. 2. At the time of starting the flow shown in FIG. 20, the noise reduction system 100 is operating in the control mode.

In step S11, the noise reduction system 100 performs noise control. Specifically, the control signal generator 210 generates a control signal that causes the loudspeaker 130 to output a control sound for reducing noise, and applies the control signal to the loudspeaker 130. For example, the control band limiting filter 211 performs band limitation on a detection signal obtained by the microphone 120, according to a predetermined passband. The path filter 212 estimates a component of a control sound included in the band-limited detection signal to generate a path characteristic signal. A component of noise included in the band-limited detection signal is estimated from the band-limited detection signal and the path characteristic signal to generate an estimated noise signal, and the control filter 213 generates a control signal based on the estimated noise signal.

In step S12, the noise reduction system 100 determines whether to update the control filter 213 or not. Specifically, the mode switching unit 230 monitors the noise reduction effect. During the time when the noise reduction effect exceeds a predetermined noise reduction level, the mode switching unit 230 determines not to update the control filter 213. The processing returns to step S11, and the noise reduction system 100 continues noise control.

If the noise reduction effect falls below the predetermined noise reduction level (step S12: Yes), the mode switching unit 230 determines to update the control filter 213. The processing proceeds to step S13, and in step S13, the mode switching unit 230 switches the operating mode from the control mode to the path characteristic measurement mode. Specifically, the mode switching unit 230 stops the control signal generator 210, and activates the path characteristic measuring unit 220.

In step S14, the path characteristic measuring unit 220 measures a path characteristic including an acoustic characteristic from the loudspeaker 130 to the microphone 120. The path characteristic to be measured is the characteristic C1 described above. For example, an input signal for path characteristic measurement is applied to the loudspeaker 130, and thereby a sound for path characteristic measurement is outputted from the loudspeaker 130. The control band limiting filter 221 performs band limitation on a detection signal obtained by detecting a sound in the space including the sound for path characteristic measurement and noise with the microphone 120, according to a predetermined passband. The path characteristic measuring unit 220 measures the path characteristic based on the band-limited detection signal. Further, the path characteristic measuring unit 220 generates the path filters 212 and 242 based on the measurement result of the path characteristic. The path characteristic measuring unit 220 calculates the path characteristics C and C" described above from the measurement result of the path characteristic C1, and applies the calculated path characteristic C to the path filter 242 and applies the calculated path characteristic C" to the path filter 212. In this way, the path filters 212 and 242 are updated.

In step S15, the control filter generating unit 240 updates the control filter 213. Specifically, the control filter generating unit 240 calculates a control characteristic K, and applies the calculated control characteristic K to the control filter 213. The generation of the control filter 213 will be described later with reference to FIG. 21.

In step S16, the mode switching unit 230 switches the operating mode from the path characteristic measurement mode to the control mode. Specifically, the mode switching unit 230 stops the path characteristic measuring unit 220, and activates the control signal generator 210. The processing returns to step S11, and the noise reduction system 100 restarts noise control.

Figure 21:
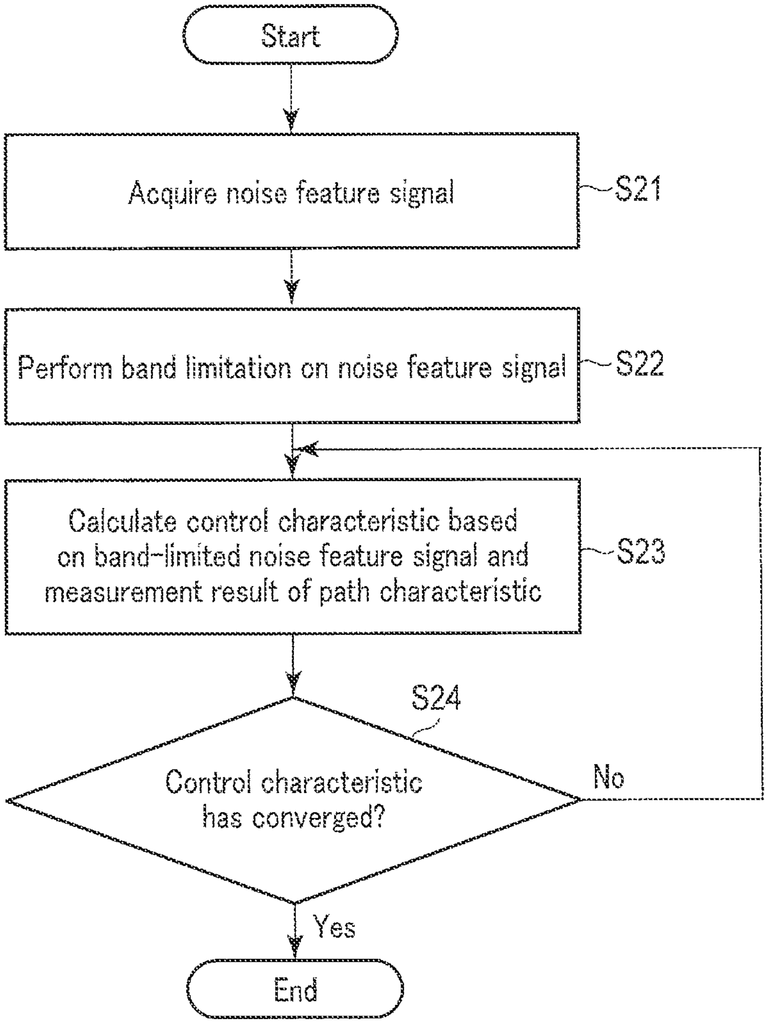
FIG. 21 is a flowchart showing processing of step S15 of FIG. 20.

FIG. 21 schematically shows an example of a procedure of a control filter generation method executed by the control filter generating unit 240.

In step S21 of FIG. 21, the control filter generating unit 240 acquires a noise feature signal including a feature of noise. The noise feature signal is continuously generated until the calculation of a control characteristic K ends. For example, the control filter generating unit 240 may use, as a noise feature signal, a noise signal obtained by detecting noise with the microphone 120 as it is. The control filter generating unit 240 may also generate a noise feature signal by specifying, from a noise signal, frequencies corresponding to peaks in a predetermined frequency band, generating bandpass filters having bands centering on the specified frequencies, filtering out a white noise signal with the generated bandpass filters, and adding up signals obtained by the filtering. The control filter generating unit 240 may also generate a noise feature signal by specifying, from a noise signal, frequencies corresponding to peaks in a predetermined frequency band, and adding up sine wave signals having frequencies in bands centering on the specified frequencies.

In step S22, the control filter generating unit 240 uses the control band limiting filter 241 to perform band limitation on the noise feature signal according to the predetermined frequency band.

In step S23, the control filter generating unit 240 calculates a control characteristic K based on the band-limited noise feature signal and a measurement result of the path characteristic obtained in step S14 of FIG. 20 (specifically, the path characteristic C derived from the measurement result of the path characteristic). The control filter generating unit 240 calculates the control characteristic K according to, for example, any one of Formulae (1), (2), and (3) above.

In step S24, the control filter generating unit 240 determines whether the control characteristic K has converged or not. In a case where the control characteristic K has not converged (step S24: No), the processing returns to step S23, and the control characteristic K is updated according to, for example, any one of Formulae (1), (2), and (3) above.

If the control characteristic K converges (step S24: Yes), the processing ends.

As above, in the present embodiment, the noise reduction system 100 includes the microphone 120, the loudspeaker 130, the control signal generator 210, the path characteristic measuring unit 220, the mode switching unit 230, and the control filter generating unit 240. The control signal generator 210 operates during the time when the operating mode is set to the control mode. The control signal generator 210 includes the control filter 213 that generates a control signal that causes the loudspeaker 130 to output a control sound for reducing noise, based on a detection signal obtained by detecting a sound in a space including noise and a control sound with the microphone 120. The path characteristic measuring unit 220 operates during the time when the operating mode is set to a path characteristic measurement mode. The path characteristic measuring unit 220 measures the path characteristic including the acoustic characteristic between the loudspeaker 130 and the microphone 120. The control filter generating unit 240 generates the control filter 213 by using a measurement result of the path characteristic, a noise feature signal including a feature of the noise, and a control band limiting filter 241 that performs band limitation on the noise feature signal according to a predetermined frequency band.

In the above configuration, the control filter 213 is generated using the noise feature signal including the feature of the noise. Thereby, noise having discrete frequency components can be reduced. In addition, the operating mode is switched between the control mode and the path characteristic measurement mode, the path characteristic is measured in the path characteristic measurement mode, and the control filter 213 is generated further based on the measurement result of the path characteristic. Thereby, a high noise reduction effect can be obtained even in a case where the acoustic characteristic between the loudspeaker 130 and the microphone 120 changes with the change of the environment such as temperature or humidity. Further, the control filter is not updated successively during the control mode, and therefore system implementation is easy.

The control filter generating unit 240 may generate a noise feature signal by specifying frequencies corresponding to peaks in a predetermined frequency band from a noise signal obtained by detecting noise with the microphone 120, generating bandpass filters having bands including the specified frequencies, filtering out a white noise signal with the generated bandpass filters, and adding up signals obtained by the filtering. The control filter generating unit 240 may also generate a noise feature signal by specifying, from a noise signal, frequencies corresponding to peaks in a predetermined frequency band, and adding up sine wave signals having frequencies in each of bands including the specified frequencies. Thereby, a high noise reduction effect can be obtained even in a case where the discrete frequencies of the noise fluctuates.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A noise reduction system comprising:

a microphone configured to convert a sound wave into an electric signal;

a loudspeaker configured to convert an electric signal into a sound wave; and processing circuitry configured to function as a mode switching unit, a control signal generator, a path characteristic measuring unit, and a control filter generating unit, wherein the mode switching unit switches an operating mode between a control mode and a path characteristic measurement mode, the control signal generator operates when the operating mode is set to the control mode and includes a control filter that generates a control signal that causes the loudspeaker to output a control sound for reducing noise, based on a first detection signal obtained by detecting a first sound including the noise with the microphone, the path characteristic measuring unit operates when the operating mode is set to the path characteristic measurement mode and measures a path characteristic including an acoustic characteristic between the loudspeaker and the microphone, and the control filter generating unit generates the control filter by using a measurement result of the path characteristic obtained by the path characteristic measuring unit, a noise feature signal including a feature of the noise, and a first control band limiting filter that performs band limitation on the noise feature signal according to a predetermined frequency band.

2. The noise reduction system according to claim 1, wherein the control filter generating unit uses, as the noise feature signal, a second detection signal obtained by detecting the noise with the microphone.

3. The noise reduction system according to claim 1, wherein the control filter generating unit generates the noise feature signal by specifying frequencies corresponding to peaks in the predetermined frequency band from a second detection signal obtained by detecting the noise with the microphone, generating bandpass filters having passbands including the specified frequencies, filtering a white noise signal with the generated bandpass filters, and adding up signals obtained by the filtering.

4. The noise reduction system according to claim 3, wherein a band width of each of the bandpass filters is adjusted to satisfy predetermined noise reduction performance.

5. The noise reduction system according to claim 1, wherein the control filter generating unit generates the noise feature signal by specifying frequencies corresponding to peaks in the predetermined frequency band from a second detection signal obtained by detecting the noise with the microphone, and adding up sine wave signals having frequencies in bands including the specified frequencies.

6. The noise reduction system according to claim 1, wherein the control filter generating unit further includes a first path filter that is generated based on the measurement result of the path characteristic and generates a control sound signal indicating a result of estimating a sound from the loudspeaker detected by the microphone, and generates the control filter based on the band-limited noise feature signal and the control sound signal.

7. The noise reduction system according to claim 1, wherein the control signal generator further includes: a second control band limiting filter that performs band limitation on the first detection signal according to the predetermined frequency band to generate a band-limited first detection signal; and a first path filter that estimates a component of the control sound included in the band-limited first detection signal to generate a path characteristic signal, the first path filter is generated based on the measurement result of the path characteristic, and the control filter generates the control signal based on the band-limited first detection signal and the path characteristic signal.

8. The noise reduction system according to claim 1, wherein the path characteristic measuring unit includes a third control band limiting filter that, according to the predetermined frequency band, performs band limitation on a third detection signal obtained by detecting a second sound including a sound for path characteristic measurement outputted from the loudspeaker and the noise with the microphone, and calculates the path characteristic based on the band-limited third detection signal.

9. The noise reduction system according to claim 1, further comprising:

a signal processing device coupled to the microphone and the loudspeaker; and a remote control device coupled to be capable of communicating with the signal processing device, wherein the processing circuitry includes a first processing circuitry provided in the signal processing device and configured to function as the control signal generator, the path characteristic measuring unit, and the mode switching unit and a second processing circuitry provided in the remote control device and configured to function as the control filter generating unit, and the remote control device receives, from the signal processing device, a second detection signal obtained by detecting the noise with the microphone, generates the noise feature signal from the second detection signal, and transmits, to the signal processing device, control filter information indicating a control filter generated by the control filter generating unit.

10. The noise reduction system according to claim 9, wherein the remote control device sets the first control band limiting filter for the signal processing device.

11. The noise reduction system according to claim 9, wherein the remote control device receives, from the signal processing device, a plurality of signals including the first detection signal, monitors a noise reduction effect based on the signals, and in response to a fact that the noise reduction effect falls below a predetermined noise reduction effect level, controls the mode switching unit to switch the operating mode to the path characteristic measurement mode.

12. The noise reduction system according to claim 1, wherein the microphone is placed in vicinity of the loudspeaker including a location on an axis of the loudspeaker, and is attached to the loudspeaker through a member attached to the loudspeaker.

13. A noise reduction method performed by a noise reduction system including a microphone configured to convert a sound wave into an electric signal and a loudspeaker configured to convert an electric signal into a sound wave, the method comprising:

switching an operating mode between a control mode and a path characteristic measurement mode;

when the operating mode is set to the control mode, using a control filter to generate a control signal that causing the loudspeaker to output a control sound for reducing noise, based on a first detection signal obtained by detecting a first sound including the noise with the microphone;

when the operating mode is set to the path characteristic measurement mode, measuring a path characteristic including an acoustic characteristic between the loudspeaker and the microphone; and generating the control filter by using a measurement result of the path characteristic, a noise feature signal including a feature of the noise, and a first control band limiting filter that performs band limitation on the noise feature signal according to a predetermined frequency band.

14. A non-transitory computer readable medium including computer executable instructions, wherein the instructions, when executed by a processor, cause the processor to perform a method comprising:

switching an operating mode between a control mode in which noise is reduced by a control sound outputted from a loudspeaker and a path characteristic measurement mode in which a path characteristic including an acoustic characteristic between the loudspeaker and a microphone is measured;

acquiring a noise feature signal including a feature of the noise;

performing band limitation on the noise feature signal according to a predetermined frequency band; and generating a control filter that generates a control signal that causes the loudspeaker to output the control sound, based on a measurement result of the path characteristic and the band-limited noise feature signal.

* * * * *